United States Patent
Shapero et al.

(10) Patent No.: US 9,628,430 B2
(45) Date of Patent: *Apr. 18, 2017

(54) NOTIFICATIONS BASED ON SOCIAL NETWORK SERVICE ACTIVITY AND PROFILE TRIGGERS

(71) Applicant: LinkedIn Corporation, Mountain View, CA (US)

(72) Inventors: Dan Shapero, Palo Alto, CA (US); Ximeng Zhang, San Jose, CA (US); James Raybould, Portola Valley, CA (US); Yue Li, San Jose, CA (US); Christian Sutherland-Wong, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 13/756,068

(22) Filed: Jan. 31, 2013

(65) Prior Publication Data
US 2014/0214943 A1    Jul. 31, 2014

(51) Int. Cl.
*H04L 12/58*    (2006.01)
*G06Q 50/00*    (2012.01)
*H04L 12/18*    (2006.01)

(52) U.S. Cl.
CPC ............ *H04L 51/32* (2013.01); *G06Q 50/01* (2013.01); *H04L 12/1895* (2013.01)

(58) Field of Classification Search
None
See application file for complete search history.

(56) References Cited

U.S. PATENT DOCUMENTS

| | | | | |
|---|---|---|---|---|
| 6,249,773 B1 * | 6/2001 | Allard | .................... | G06Q 30/06 |
| | | | | 705/26.8 |
| 8,099,325 B2 * | 1/2012 | Gangadharpalli | ..... | G06Q 30/02 |
| | | | | 705/14.49 |
| 8,533,144 B1 * | 9/2013 | Reeser | .................... | G06Q 30/02 |
| | | | | 705/14.53 |
| 8,583,750 B1 | 11/2013 | Hewinson | | |

(Continued)

OTHER PUBLICATIONS

"U.S. Appl. No. 13/755,546, Final Office Action mailed Apr. 27, 2016", 14 pgs.

(Continued)

*Primary Examiner* — Backhean Tiv
(74) *Attorney, Agent, or Firm* — Schwegman Lundberg & Woessner, P.A.

(57) ABSTRACT

An embodiment searches a social network for at least one trigger event, detects one or more trigger events, and communicates the detected one or more trigger events as an alert. Searching the social network comprises searching member profiles and searching member activities. Detected one or more trigger events are centralized into a sortable list and prioritized based on business entities and the importance of the trigger events to persons related to the business entities. The centralized sortable list is fed into a customer relations management system which presents the alerts on a user interface. A plurality of types of triggers includes people updates, company updates, product purchases, and product usage.

12 Claims, 16 Drawing Sheets

(56) References Cited

U.S. PATENT DOCUMENTS

| | | | | |
|---|---|---|---|---|
| 8,819,134 B2* | 8/2014 | Ham | H04L 12/1859 | 709/204 |
| 9,037,577 B1* | 5/2015 | Saylor | G06F 17/30551 | 707/725 |
| 9,288,123 B1* | 3/2016 | Safford | G06Q 50/01 | |
| 2005/0203807 A1* | 9/2005 | Bezos | G06F 17/30867 | 705/14.53 |
| 2007/0043609 A1* | 2/2007 | Imam | G06Q 10/06 | 705/7.15 |
| 2010/0070336 A1* | 3/2010 | Koegler | G06Q 10/06 | 705/7.29 |
| 2010/0082403 A1* | 4/2010 | Higgins | G06Q 30/02 | 705/7.29 |
| 2010/0121684 A1* | 5/2010 | Morio | G06Q 30/02 | 705/7.13 |
| 2010/0145771 A1* | 6/2010 | Fligler | G06Q 10/10 | 705/319 |
| 2011/0029512 A1* | 2/2011 | Folgner | G06F 17/30887 | 707/726 |
| 2011/0161987 A1* | 6/2011 | Huang | G06Q 10/10 | 719/318 |
| 2011/0201317 A1* | 8/2011 | Karandikar | G06Q 30/02 | 455/414.1 |
| 2011/0258067 A1* | 10/2011 | Rowell | G06Q 30/06 | 705/26.2 |
| 2012/0089610 A1* | 4/2012 | Agrawal | G06F 17/30286 | 707/741 |
| 2012/0102114 A1* | 4/2012 | Dunn | G06Q 10/10 | 709/204 |
| 2012/0102153 A1* | 4/2012 | Kemp | G06F 17/3051 | 709/219 |
| 2012/0158751 A1* | 6/2012 | Tseng | G06Q 30/02 | 707/751 |
| 2012/0158843 A1* | 6/2012 | Angani | G06Q 50/01 | 709/204 |
| 2012/0210247 A1* | 8/2012 | Khouri | G06Q 10/101 | 715/751 |
| 2013/0006707 A1* | 1/2013 | Ssubhanjan | | 705/7.29 |
| 2013/0006795 A1* | 1/2013 | Kahn | G06Q 30/02 | 705/26.2 |
| 2013/0030887 A1 | 1/2013 | Calman et al. | | |
| 2013/0046634 A1* | 2/2013 | Grigg | G06Q 30/00 | 705/14.58 |
| 2013/0054517 A1* | 2/2013 | Beechuk | G06F 17/30867 | 707/609 |
| 2013/0066972 A1 | 3/2013 | Mcleod | | |
| 2013/0110932 A1* | 5/2013 | Itani | H04L 29/08072 | 709/204 |
| 2013/0130659 A1* | 5/2013 | Sadhvani | H04W 4/206 | 455/414.1 |
| 2013/0132861 A1* | 5/2013 | Kienzle | G06Q 10/10 | 715/753 |
| 2013/0144701 A1* | 6/2013 | Kulasooriya | G06Q 20/202 | 705/14.24 |
| 2013/0166379 A1* | 6/2013 | Ehindero | G06Q 30/02 | 705/14.52 |
| 2013/0198652 A1* | 8/2013 | Dunn | G06F 3/0484 | 715/751 |
| 2013/0246524 A1* | 9/2013 | Berner | G06Q 50/01 | 709/204 |
| 2013/0268591 A1* | 10/2013 | Chen et al. | | 709/204 |
| 2013/0297440 A1* | 11/2013 | Bennett | G06Q 30/08 | 705/26.3 |
| 2013/0346172 A1* | 12/2013 | Wu | G06Q 30/0214 | 705/14.16 |
| 2014/0006129 A1* | 1/2014 | Heath | G06Q 30/0222 | 705/14.23 |
| 2014/0075352 A1* | 3/2014 | Hansen | G06F 9/4451 | 715/765 |
| 2014/0081882 A1* | 3/2014 | Govindaraman | G06Q 50/01 | 705/319 |
| 2014/0149178 A1* | 5/2014 | Hedges | G06Q 30/0201 | 705/7.29 |
| 2014/0149245 A1* | 5/2014 | Topol | G06Q 10/10 | 705/26.3 |
| 2014/0164502 A1* | 6/2014 | Khodorenko | H04L 67/325 | 709/204 |
| 2014/0195333 A1* | 7/2014 | Gupta | G06Q 50/01 | 705/14.43 |
| 2014/0214941 A1 | 7/2014 | Shapero et al. | | |
| 2014/0214943 A1* | 7/2014 | Shapero | H04L 12/1895 | 709/204 |
| 2014/0297547 A1* | 10/2014 | Kruglick | G06Q 10/00 | 705/319 |
| 2015/0237205 A1* | 8/2015 | Waller | H04M 3/5158 | 379/266.08 |

OTHER PUBLICATIONS

"U.S. Appl. No. 13/755,546, Final Office Action mailed Jun. 4, 2015", 12 pgs.

"U.S. Appl. No. 13/755,546, Non Final Office Action mailed Nov. 5, 2015", 13 pgs.

"U.S. Appl. No. 13/755,546, Non Final Office Action mailed Dec. 29, 2014", 11 pgs.

"U.S. Appl. No. 13/755,546, Respons filed Sep. 4, 2015 to Final Office Action mailed Jun. 4, 2015", 12 pgs.

"U.S. Appl. No. 13/755,546, Response filed Mar. 7, 2016 to Non Final Office Action mailed Nov. 5, 2015", 13 pgs.

"U.S. Appl. No. 13/755,546, Response filed Apr. 29, 2015 to Non Final Office Action mailed Dec. 29, 2014", 13 pgs.

U.S. Appl. No. 13/755,546, filed Jan. 31, 2013, Contact Prioritization and Assignment Using a Social Network.

* cited by examiner

38

- Direct Connection
- Following
- In Address Book (Contact List)
- In Other (e.g., External) Network
- Attended Common Event
- Network Interaction
    - (e.g., message, share, poll, like, comment, etc.)
- Offsite Interaction
    - (e.g., e-mail, direct tweet, re-tweet, etc.)
- Common Entity
    - (e.g., company, school, group, organization, etc.)
- Historical
    - (e.g., searched for..., viewed profile, viewed content)
- Common Profile Attributes or Characteristics
    - (skill, industry, location, specialties, associations, certifications, professional designations, awards, degree/major/minor)
- Connection at Company
- Alumni at Company
- Recently Joined/Left Company
- Current/Past Employer
- Applied for Positions with Company
- Interacted with Employee at Company
- Viewing history
- In Group
- Group in Network
- Groups being Managed
- Interacted with Group Content

FIG. 3

- YOU have seven shared connections.

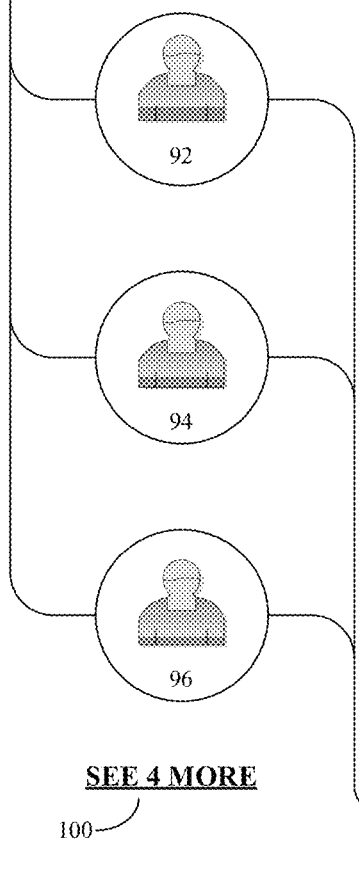

JANE DOE (1st)
Silicon Valley Innovation, Social Networking...
You currently work at ACME Products with JANE

JOHN SMITH (1st)
Founder, CTO at Cloud Computing Inc.
You worked with John at Cloud Computing 2002 -2005

SARAH GUNDERSON (1st)
Engineering Director at Express Tech.
You worked with Sarah at Cloud Computing 2004 -2005

SEE 4 MORE
100

PETER QUICK
CEO Game Machine, Inc.

*FIG. 6*

| LinkedIn ID # | LinkedIn Company Name | Industry | # of hires | # of Members | # of Recruiters | Estimated | State | DUNS # |
|---|---|---|---|---|---|---|---|---|
| 1880 | cognizant-technology-solutions | information technology | 6,149 | 52,999 | 201 | $2,275,513 | NJ | 799501301 |
| 2810 | l-3-communications | defense & space | 1,298 | 17,333 | 138 | $884,556 | NY | 8098849 |
| 1872 | sungard | information technology | 1,465 | 13,466 | 72 | $717,625 | PA | 101422721 |
| 4764 | blackrock | financial services | 1,446 | 6,288 | 46 | $643,540 | NY | 788507652 |
| 3035 | starwood-hotels-&-resorts-w | hospitality | 1,252 | 13,073 | 33 | $635,087 | NY | 37792031 |
| 3038 | travelers | insurance | 707 | 13,806 | 107 | $491,901 | NY | 6863540 |
| 2500 | euro-rscg | marketing and advertising | 1,054 | 4,153 | 19 | $465,865 | NY | 9475 02059 |
| 2449 | hilton-worldwide | hospitality | 1,080 | 17,773 | 39 | $435,793 | VA | 6650531 |
| 106426 | the-world-bank | banking | 1,001 | 9,028 | 11 | $435,791 | DC | 5691576 |
| 7486 | globallogic | computer software | 593 | 3,732 | 78 | $413,948 | VA | 101692099 |
| 3175 | cigna | health, wellness and fitness | 788 | 10,095 | 38 | $402,575 | PA | 2905844 |
| 5029 | ingersoll-rand | machinery | 805 | 7,311 | 58 | $396,717 | Co. Dublin | 875555037 |
| 4086 | news-corporation | entertainment | 486 | 3,892 | 14 | $357,133 | NY | 175778443 |
| 3185 | dupont | chemicals | 475 | 13,092 | 40 | $317,662 | DE | 11463964 |
| 2272 | delta-air-lines | airlines/aviation | 420 | 14,561 | 63 | $311,247 | GA | 1315704 |
| 3884 | cend | marketing and advertising | 668 | 3,565 | 6 | $300,464 | NY | 6824871 |
| 4299 | metso | hospital & health care | 389 | 5,344 | 39 | $295,883 | NY | 8917242 |
| 2184 | vangents-inc. | information technology | 465 | 1,735 | 24 | $255,886 | VA | 0 |
| 5461 | martech | information technology | 321 | 2,988 | 68 | $244,660 | VA | 1951 4574 |
| 4077 | weber-shandwick | public relations | 526 | 2,470 | 7 | $241,085 | NY | 5551 6311 |
| 157061 | danaher | electrical and electronic | 509 | 4,798 | 8 | $238,088 | DC | 2828770 |
| 2122 | wyndham-worldwide | hospitality | 300 | 3,677 | 72 | $233,090 | NJ | 2974476 |
| 4269 | estee-lauder | cosmetics | 495 | 5,428 | 7 | $227,346 | NY | 783615665 |

FIG. 10

Results below identify likely decision-makers and/or responsive influencers sorted by most likely first To add >=1 individuals directly to SFDC, please select them using the drop-down and then click "Add to Salesforce" at bottom of page. ~1002

[Select Contact Role ▾] ☒ Jeff Weng: Head of Organization and Staffing - APAC ~1040
Singapore - All [View LI Profile] [View CAP profile] [See emails]
500+ connections, Engagement: Power user (5/5) ●|
CAP: YES Inactive, 25 visits, 104 profiles viewed, 0 inmails sent
7 jobs posted
* Your 1st degree John Eng, Head of Marketing, Asia Pacific and Japan (APJ) at LinkedIn [View Profile]
* Your 1st degree HETAL SONPAL, Director, Strategic Sales at LinkedIn [View Profile]

[Select Contact Role ▾] ☒ Patrick Cronin: Head of Sales Recruiting - Americas ~1060
San Francisco Bay Area [View LI Profile] [View CAP profile] [See emails]
500+ connections, Engagement: Power user (5/5) ●|
CAP: YES Inactive, 15 visits, 77 profiles viewed, 1 inmails sent
25 jobs posted
Current: Sales_pro Subscriber, from Aug 2007 to now
* Your 1st degree Pam Headley, Your LinkedIn media tour guide [View Profile]
* Your 1st degree craig campbell, Director of Global Staffing at Dolby Laboratories [View Profile]
* Your 1st degree Andrew Gregory, Director, Customer Analytics at Western Union [View Profile]
* Your 1st degree Ben Kaufman, Sales Staffing Lead at Google [View Profile]
* Your 1st degree Jaime Bott, Recruiting Manager at Sequoia Capital [View Profile]
* Your 1st degree Kristy McKay, HR Professional at LinkedIn [View Profile]
* Your 1st degree Evan Kam, Senior Recruiter at LinkedIn [View Profile]
* Your 1st degree Karen Scott, Executive Assistant at Philips Lumileds [View Profile]
* Your 1st degree Bruce Griehshammer, Sales Compensation Professional [View Profile]
* Your 1st degree Chris Obenza, Program Manager at WorkforceLogic, a ZeroChaos company [View Profile]

NOTIFICATIONS BASED ON SOCIAL NETWORK SERVICE ACTIVITY AND PROFILE TRIGGERS

TECHNICAL FIELD

The present disclosure generally relates to data processing systems. More specifically, the present disclosure relates to methods, systems and computer program products that estimate the hierarchy of an organization from entries and relationships in social graphs of a social network service.

BACKGROUND

The advent of social networks has provided an opportunity for organizations, be they sales organizations or other organizations, to prioritize likely prospects, and to assign the most likely prospects respectively to the people internal to the organization who are most likely to be successful in closing a transaction with the prospect. When a prospect has been assigned to an internal organization resource, such as an account executive in one embodiment, a background process may monitor certain profile information and/or activity of members of a social network who are employed by the prospect. Upon detecting certain triggering events (e.g., a change in a member profile that provides information to the sales organization that may lead to a sale, or some other behavior such as content consumption, joining or leaving a group, and the like, exhibited by one or more social network members employed by that prospect), a notification can be communicated to the account executive with a suggestion to take some action. For instance, if a member's job title changes at a prospect, or if a member leaves his employment with the prospect for another employer, a notification might be communicated to the account executive who has a relationship with the member. The notification might indicate some specific action that the account executive should take. This is made possible by monitoring member profiles and member activities on an online social network service.

As a general matter, online social network services provide users with a mechanism for defining, and memorializing in a digital format, their relationships with other people. This digital representation of real-world relationships is frequently referred to as a social graph. Many social network services utilize a social graph to facilitate electronic communications and the sharing of information between its users or members. For instance, the relationship between two members of a social network service, as defined in the social graph of the social network service, may determine the access and sharing privileges that exist between the two members. As such, the social graph in use by a social network service may determine the manner in which two members of the social network service can interact with one another via the various communication and sharing mechanisms supported by the social network service.

Some social network services aim to enable friends and family to communicate and share with one another, while others are specifically directed to business users with a goal of facilitating the establishment of professional networks and the sharing of business information. For purposes of the present disclosure, the terms "social network" and "social network service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

With many social network services, members are prompted to provide a variety of personal information, which may be displayed in a member's personal web page. Such information is commonly referred to as "personal profile information", or simply "profile information", and when shown collectively, it is commonly referred to as a member's profile. For example, with some of the many social network services in use today, the personal information that is commonly requested and displayed as part of a member's profile includes a member's age (e.g., birth date), gender, contact information, home town, address, the name of the member's spouse and/or family members, a photograph of the member, interests, and so forth. With certain social network services, such as some business network services, a member's personal information may include information commonly included in a professional resume or curriculum vitae, such as information about a person's education, employment history, job skills, professional organizations, and so forth. With some social network services, a member's profile may be viewable to the public by default, or alternatively, the member may specify that only some portion of the profile is to be public by default. As such, many social network services serve as a sort of directory of people to be searched and browsed.

Because social network services are a rich source of information about people, social network services are an extremely useful tool when performing certain tasks. For example, many people use social network services to search for, and/or browse, member profiles that exhibit various desired characteristics. For instance, a person may search for persons who have profiles indicating the possession of certain technical skills, and educational and professional experiences and backgrounds. Similarly, when someone needs to hire a person employed in a particular profession (e.g., a general contractor, a doctor, a lawyer, a landscaper, a plumber, an investment banker, and so forth), that person may turn to a social network service to identify persons who possess the requisite skills and qualifications. In another scenario, a person may desire to contact someone for the purpose of exploring or proposing the possibility of a particular business arrangement or relationship. Accordingly, the person may use a social network service to identify the appropriate persons to contact.

DESCRIPTION OF THE DRAWINGS

Some embodiments are illustrated by way of example and not limitation in the FIG.s of the accompanying drawings, in which:

FIG. 3 is a table showing examples of the many different types of associations that may be represented with an edge connecting two nodes in a graph data structure, consistent with some embodiments of the invention;

FIGS. 6 through 8 are examples of some user interface elements that convey a visual representation of connection paths in a social graph connecting a user with a target member, consistent with embodiments of the invention;

FIG. 10 is a screen shot of a user interface with a prioritization of prospective accounts in order of estimated spend in an embodiment.

FIG. 10A is a screen shot of a rank-ordered list of people believed to be key influencers at a prospective account in an embodiment.

Figure 13:
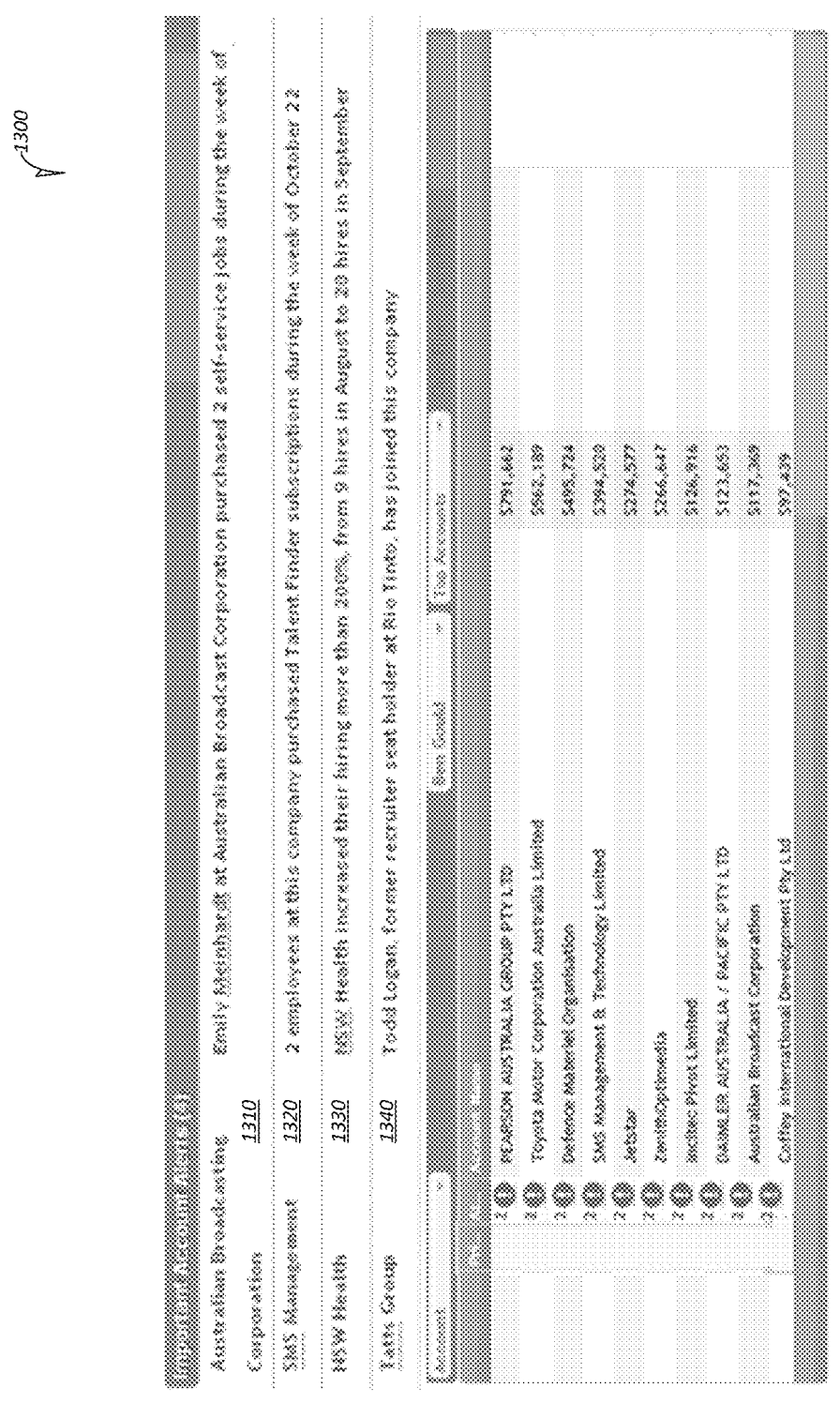

FIG. 13 is a screen shot illustrating trigger alerts and prioritized accounts in an embodiment.

DETAILED DESCRIPTION

Figure 1:
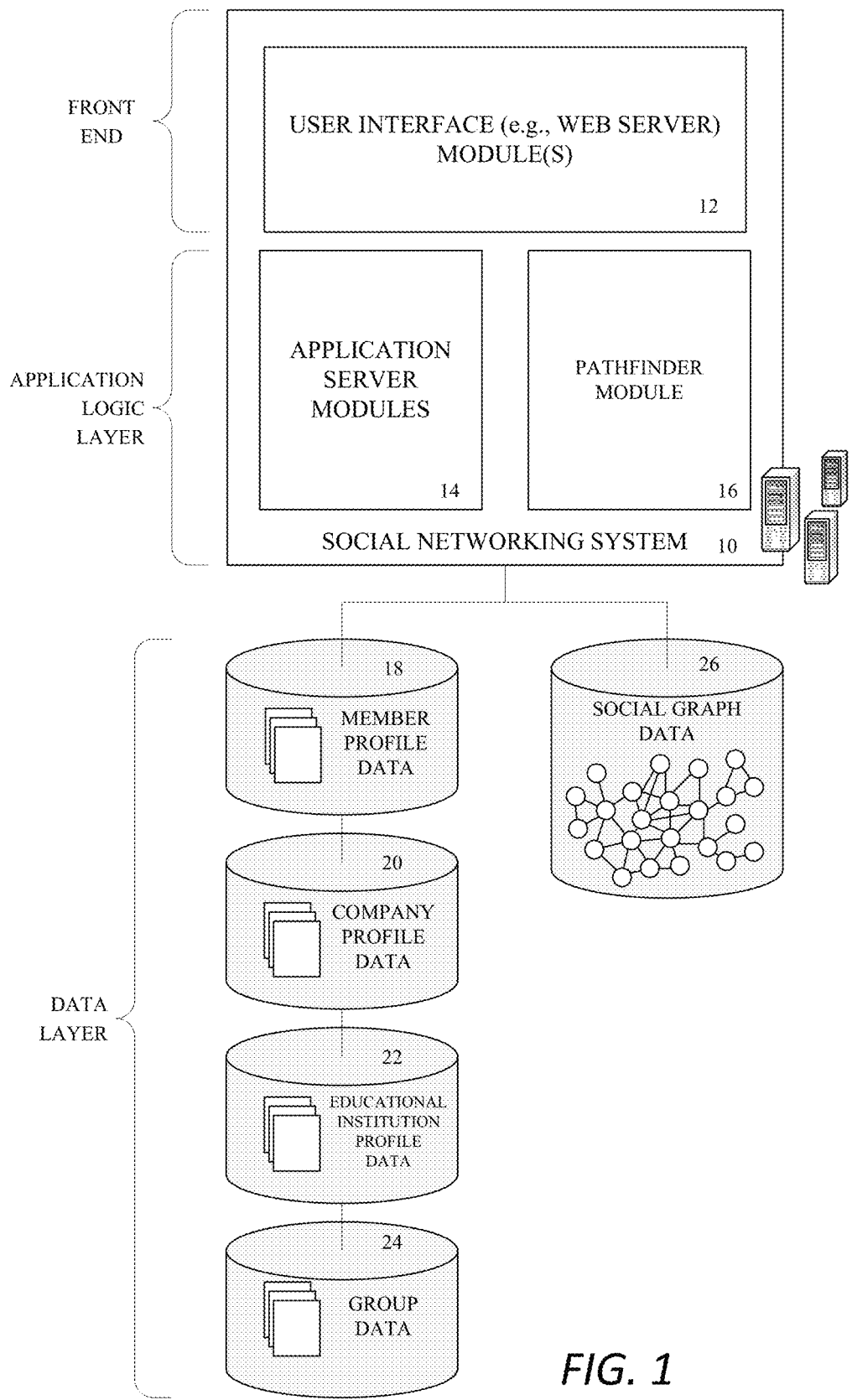
FIG. 1 is a block diagram illustrating various functional components of a social network system with a pathfinder module, consistent with some embodiments of the invention, for use with a wide variety of applications, and specifically for identifying and then presenting connection paths in a social graph connecting a user with a target member of the social network service.

The present disclosure describes methods, systems and computer program products for inferring the hierarchy, or the estimation of the hierarchy, of an organization by leveraging a social graph of a social network service to identify and convey information about various connection paths and relationships between and among members, as defined in or inferred from the social graph of the social network service. In addition, finding of these paths are useful for sales, marketing, and related business support from the social graphs of members of a social network service, such as a professional social network, and also from the social graph of the social network service itself. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

Consistent with embodiments of the invention, some of the many tasks people commonly use a social network service to perform are improved by conveying to a user of the service specific information concerning the associations (e.g., relationships and affiliations) that a user, or an entity on whose behalf the user is acting (e.g., a company, group or other organization with which the user is associated), might share in common with another member of the social network service, while the user is performing a particular task. Specifically, the inventive concepts described herein involve techniques for analyzing a social graph to identify connection paths connecting a user (or, some other entity) with another member of the social network service, and then to present a visual representation of those connection paths that are determined to be well, or best, suited for a particular purpose. While social graphs used by many conventional social network services model only the relationships that exist between people, embodiments of the present invention use a social graph that includes not only people, but other types of entities as well. For example, a social graph consistent with some embodiments of the invention may include entity types such as, companies, educational institutions, groups, and so forth. As such, a connection path in the social graph that connects two members may be based on a wide variety of associations between the various entities, including personal relationships between members, a common employment relationship with a particular company, common membership in a group, and so forth.

The algorithmic processes used to identify and present the connection paths connecting a user with a target member are implemented with a combination of hardware (e.g., computer processors and memory) and software (e.g., executable instructions) that may be generally referred to herein as a pathfinder module. Furthermore, the inventive concepts that are presented herein are generally applicable to a wide variety and nature of applications and tasks. However, for brevity, the examples of the inventive concepts described herein are primarily presented in the context of two specific types of applications including applications involving electronic or digital messaging or communication systems and techniques, and applications for facilitating browsing and searching of member profiles.

Consistent with some embodiments of the invention, a social network service maintains a social graph, implemented as a graph data structure having nodes and edges, where the nodes represent different entities and the edges represent various associations or relationships between entities. For example, with some embodiments, the entity types may include people, companies, educational institutions (e.g., schools and universities), and groups (e.g., online groups, or professional organizations), among others. Accordingly, the edges that connect any two nodes (entities) represent types of associations between the entities, and will therefore depend in part on the entities involved. For example, an edge connecting two nodes that represent people may be representative of a specific type of relationship between the two people, including a direct, bilateral connection between the two people. An edge connecting a first node, representing a person, with a second node, representing a company, may be representative of an employment relationship (current or previous) between the person and the company. In addition to the edges having a particular type, representative of the nature of the relationship between two entities, each edge connecting two entities is assigned an edge score to reflect the strength, or relevance, of the particular association.

Consistent with some embodiments, when a user is performing a particular task, the social network service (e.g., specifically, the pathfinder module) will perform an algorithmic process to analyze the social graph and to identify the connection paths that connect a user (e.g., the person performing the task) or some entity specified by the user and on whose behalf the user may be acting, with another member of the social network service. The connection path or paths that are determined to be strongest, or most relevant, with respect to the particular task being performed, are then visually presented to the user, providing the user with important contextual information for completing the task. For purposes of the present disclosure, to distinguish the person involved in the performance of a task with those persons who may be subjects of a task, the term "user" is used herein to identify the person who is performing a task, while the terms "target" and/or "target member" are used to identify a subject of the task. Similarly, in the specific context of a digital messaging application, the terms "message sender" and "message recipient" are used herein. While a message recipient is the member to whom a message is addressed, a message sender is the user performing the task of preparing and sending a message on his or her own behalf, or on behalf of an entity, such as a company, group or other organization.

Consistent with some embodiments of the invention, for each connection path connecting a user to a target member, a path score is derived to reflect the overall connection strength (or relevance) of the path connecting the user with the target. For example, with some embodiments, the path score may be derived by simply aggregating (e.g., summing, or otherwise combining with an algorithm or formula) the individual edge scores that correspond with the edges connecting the nodes that ultimately connect the user with the target member. As described in greater detail below, a variety of algorithms may be used to derive the individual edge scores for a particular edge and/or edge type connecting any two nodes in the social graph. Similarly, a variety of algorithms may be used to derive the path scores for the connection paths connecting a user with a target. For example, with some embodiments, various weighting factors may be applied to influence (e.g., increase or decrease) the edge score for a particular edge type (e.g., the type of association existing between two nodes in the social graph), based on the particular task for which the connection paths are being identified and presented. In any case, once the various connection paths connecting a user or some user-specified entity to a target member have been identified and ordered or ranked by path score, a visual representation of the connection path having the highest path score may be presented to the user. With some embodiments, a visual representation of several independent connection paths may be presented.

In the context of a messaging application, and particularly a web-based messaging application, consistent with some embodiments of the invention, when a message sender has addressed a message to another member of the social network service (e.g., a message recipient), the message sender is presented with a visual representation of the best connection path or paths connecting the message sender to the message recipient, as determined by analysis of the social graph maintained by the social network service. With some embodiments, the algorithm used to derive path scores for the various connection paths connecting the message sender to the message recipient may be selected based on an inferred type of communication, or an explicitly selected type of communication. For instance, with some embodiments, the social network service may use machine learning techniques and/or various algorithms to infer the type of communication (e.g., the purpose or reason the message sender is communicating with the message recipient), and then based on this information, a particular algorithm for deriving the path scores may be selected. With some embodiments, the message sender may explicitly select or otherwise specify the type of communication, such that the selected communication type will influence the algorithm used to derive the path scores for the connection paths connecting the message sender with the message recipient.

By tailoring the algorithm that may be used to derive the path scores to a specific task (e.g., sending a message) and/or a specific context for a task (e.g., a type of communication for the task of sending a message), the most relevant connection path(s) can be presented to the user, based on the task and context in which the task is being performed.

With some embodiments, the visual representation of the best connection path or paths (e.g., the connection path or paths with the highest path scores) may be automatically embedded or otherwise included in the content of a message being prepared by the message sender. Consequently, when the message recipient receives the message, the message recipient can view a visual representation of the best connection path or paths connecting the message sender with the message recipient. Alternatively, the connection path or paths may be presented in a manner that allows the message sender to simply reference the relevant information when the message sender is composing the message. For instance, with some embodiments, the visual representation of the connection path may be presented as a separate element of a graphical user interface displayed when the message sender is composing the message. Similarly, the visual representation of the connection path or paths may be presented to a message recipient, not as part of a received electronic message, but instead as part of a separate user interface element that is presented when the message recipient is accessing and viewing the electronic message. In either case, by identifying and then presenting information indicating how the message sender and message recipient are associated or related (e.g., connected via the social graph), the message recipient is more likely to be receptive to receiving, reading, and replying to the message. This is particularly advantageous in an environment where people are frequently overloaded with information and are receiving hundreds of messages per day.

With some embodiments, and specifically in the context of an application that enables users to search for or otherwise browse member profiles, the strongest or most relevant connection path or paths connecting the user with a target member will be presented when the user is viewing the profile of the target member. For example, a user may perform a search of member profiles by specifying various desirable member attributes or characteristics. For instance, a person may perform a search by specifying one or more member profile characteristics, including: a company at which one is employed, a job title, a college or university attended, and one or more possessed skills. In response to the person's query, the social network service may present to the person a list of members having member profile attributes or characteristics that match (partially or fully) the characteristics specified in the query. When the person selects a particular member from the list, the person will be presented with the selected member's profile information. In addition, the social network service may present a visual representation of a connection path connecting the person to the selected member, where the connection path has been selected for having the highest path score of all connection paths connecting the person with the target member. Alternatively, a visual representation of several individual connection paths may be presented. With some embodiments, the connection path or paths may be presented automatically with the profile information of the selected member. Alternatively, with some embodiments, a graphical user interface element (e.g., a button or link) may be provided with the selected member profile, such that when the person selects or otherwise interacts with the graphical user interface element, the social network service will invoke the algorithmic process for identifying and presenting the connection path having the highest path score.

With some embodiments, the user that is performing a search of member profiles, or otherwise browsing member profiles, may specify as a sort of proxy an alternative entity (e.g., person, company or other organization) to serve as the starting or beginning node for purposes of identifying the connection paths to an identified target member. For instance, if an independent party has been tasked with inferring the organization chart for a particular part of a particular company, party may specify that the company be used as the starting node in the social graph of any connection paths to a particular target member. As such, a pathfinder module of the social network service will attempt to identify and present connection paths connecting the specified company with the identified target member. In such a scenario, the nodes forming the connection paths between the company and the target member may include entities of various types, including but not limited to members who are current or past employees of the specified company, other companies that are associated with the specified company, and schools whose graduates are employed by the specified company.

Referring again to a messaging application, consistent with some embodiments a message sender may compose a message intended for multiple message recipients. For instance, a person may use the social network service to compile a list of target members to contact as potential candidates for a job opening. The person may then compose a single generic message to be sent to all the target members on the list, without manually personalizing or customizing the content of the message for each individual member specified as a message recipient. In general, the connection paths from the message sender (the person or the company on whose behalf the person is acting) to each message recipient will be different. In this scenario, the pathfinder module of the social network service is automatically invoked once for each individual message recipient. With each invocation, the pathfinder module will attempt to identify connection paths connecting the message sender with an individual message recipient. Upon successfully identifying one or more connection paths, the message content to be communicated to a particular message recipient will automatically be modified to include a description or graphical visualization of one or more of the strongest, or most relevant, connection paths. In this way, the messaging application can perform a mass customization operation to customize or personalize an otherwise general or generic message so that a customized or personalized instance of the message is communicated to each message recipient. In particular, the customized or personalized message may include a visual representation of a connection path between the message recipient and the message sender, or the message recipient and some entity on behalf of which the message is being communicated. Alternatively, the message may include information identifying one or more entities in the connection path with an indication of how the message sender or the entity on whose behalf the message is being sent and the message recipient are associated. The personalization of the message to provide some social context will increase the relevance of the message to the particular message recipient.

With some embodiments, in addition to presenting the user with a visual representation of the connection path with the highest path score, the actual path score may be presented to the user. The path score may be normalized in some manner for easy comparison with other path scores, thereby giving the user a sense of which connection paths may be best for a particular task. The path score may be conveyed on some arbitrary scale (e.g., a scale of one to five, with one being a low score, and five being a high score), or simply as a raw number. Additionally, the visual representation of the connection path connecting the user with the target member may be presented in an interactive manner, such that additional information about various entities and associations (e.g., relationships and/or affiliations) may be easily obtained by the user, for example, by manipulating a cursor control device or interacting with a touch sensitive display to select or hover over various user interface elements included in the visual representation of the connection path.

With some embodiments, various user interface controls may be presented with the visual representation of the connection path, thereby allowing the user to very quickly navigate or cycle through the many connection paths connecting the user with the target member, or filter and/or sort the connection paths based on various connection path parameters. For example, by selecting a particular button or link associated with a navigation control, the view of the visual representation of the connection path with the highest path score may be replaced with a view of a visual representation of the connection path with the second highest path score. With some embodiments, user interface controls may be presented to enable the user to filter and/or sort connection paths based on certain entities, entity types, edge types and/or any combinations thereof. For instance, a filtering mechanism may allow the user to select for presentation only those connection paths that include a particular type of entity (e.g., a person, a company, a school or university, or a group), or even a particular entity (e.g., all connection paths including a specific entity, such as the person, John Smith, or a specific educational institution, such as Stanford University). Similarly, the filtering mechanism may enable the user to identify a particular entity to be excluded from all connection paths, such that only those connection paths that do not include the selected entity will be presented to the user. With some embodiments, the filtering mechanism may enable the user to specify various requirements concerning the number of nodes in a connection path, such as a maximum, minimum, or exact number of nodes separating the user with the target member. For instance, the user may desire to view a visual representation of all connection paths between the user and a target member, where the number of nodes between the user and the target member is two or less. Accordingly, the pathfinder module will select for presentation only those connection paths satisfying the specified requirements, and will generally present the selected connection paths in an order with the connection path having the highest path score presented first. Additionally, with some embodiments, various controls may allow the user to explicitly select other connection path parameters that influence the algorithm used to derive the path scores for the connection paths. Further detail about the technological operation of social networks useful in embodiments hereof may be found in U.S. patent application Ser. No. 13/430,284 entitled "Leveraging a Social Graph for use with Electronic Messaging," assigned to the assignee of this patent, and incorporated herein by reference in its entirety. Various embodiments of the inventive subject matter presented herein provide the aforementioned features and advantages, as well as other advantages, which will be readily apparent from the following description of the various figures.

FIG. 1 is a block diagram illustrating various functional components of a social network system 10 with a pathfinder module 16 for use with a wide variety of applications and specifically for identifying, and then presenting, connection paths connecting a user or user-specified entity with a target member of the social network service, consistent with some embodiments of the invention. As shown in FIG. 1, the social network system 10 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 12, which receives requests from various client-computing devices, and communicates appropriate responses to the requesting client devices. For example, the user interface module(s) 12 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer includes several databases, including databases 18-24 for storing data for various entities of the social graph, including member profiles 18, company profiles 20, educational institution profiles 22, as well as information concerning various online or offline groups 24. In addition, the graph data structure is implemented with a graph database 26, which is a particular type of database that uses graph structures with nodes, edges, and properties to represent and store data. Of course, with various alternative embodiments, any number of other entities might be included in the social graph, and as such, various other databases may be used to store data corresponding with other entities.

Consistent with some embodiments, when a person initially registers to become a member of the social network service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored, for example, in the database with reference number 18.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity, which may or may not be included in the social graph. Various other types of relationships that may exist between different entities, and represented in the social graph data 26, are described in connection with FIG. 3.

The social network service may provide a broad range of other applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in database 24. When a member joins a group, his or her membership in the group will be reflected in the social graph data stored in the database with reference number 26. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the database with reference number 26.

The application logic layer includes various application server modules 14, which, in conjunction with the user interface module(s) 12, generates various user interfaces (e.g., web pages) with data retrieved from various data sources in the data layer. With some embodiments, individual application server modules 14 are used to implement the functionality associated with various applications, services and features of the social network service. For instance, a messaging application, such as an email application, an instant messaging application, or some hybrid or variation of the two, may be implemented with one or more application server modules 14. Similarly, a search engine enabling users to search for and browse member profiles may be implemented with one or more application server modules 14. Of course, other applications or services that utilize the pathfinder module 16 may be separately embodied in their own application server modules 14.

In addition to the various application server modules 14, the application logic layer includes the pathfinder module

16. As illustrated in FIG. 1, with some embodiments the pathfinder module 16 is implemented as a service that operates in conjunction with various application server modules 14. For instance, any number of individual application server modules 14 can invoke the functionality of the pathfinder module 16, to include an application server module associated with a messaging application and/or an application server module associated with an application to facilitate the viewing of member profiles. However, with various alternative embodiments, the pathfinder module may be implemented as its own application server module such that it operates as a stand-alone application. With some embodiments, the pathfinder module may include or have an associated publicly available application programming interface (API) that enables third-party applications to invoke the functionality of the pathfinder module.

Generally, the pathfinder module 16 takes as input parameters that, at a minimum, identify two different nodes corresponding with two entities (e.g., two persons, or a person and a company, etc.) in a social graph that is implemented with a graph data structure (e.g., social graph data 26). Using the input parameters, the pathfinder module 16 analyses the social graph data 26 to identify the connection paths in the social graph that connect the two entities, if any exist. With some embodiments, additional input parameters may be provided to the pathfinder module 16 and used to refine the connection paths selected for potential presentation to the user. These parameters include, for example, filtering criterion to include or exclude connection paths having particular entities, or particular entity types, or specific edge types. Once the set of connection paths satisfying the input parameters has been identified, the pathfinder module 16 derives a path score for each connection path, for example, by aggregating the individual edge scores for the edges that connect the different nodes included in the connection paths. Finally, the pathfinder module provides the information corresponding with the connection paths to the application that invoked the pathfinder module so that a visual representation of one or more connection paths can be presented to the user.

The pathfinder module 16 can be invoked from a wide variety of applications. In the context of a messaging application (e.g., email application, instant messaging application, or some similar application), the pathfinder module 16 may be invoked to provide a message sender with a visual representation of a connection path between the message sender and a person to whom the message sender has addressed a message (e.g., the message recipient). Similarly, the pathfinder module 16 may be invoked to provide a message sender with a visual representation of a connection path connecting an entity on whose behalf the message sender is acting (e.g., company, group, or other organization) with a message recipient. An example of such an embodiment of the invention is illustrated and described in connection with FIGS. 9 through 13. In the context of an application that allows one to browse member profiles, the pathfinder module 16 may be invoked to present to the viewing user a connection path from the user to a target member whose profile is being viewed by the user. An example of such an embodiment of the invention is illustrated and described in connection with FIGS. 14 through 16.

Figure 2:
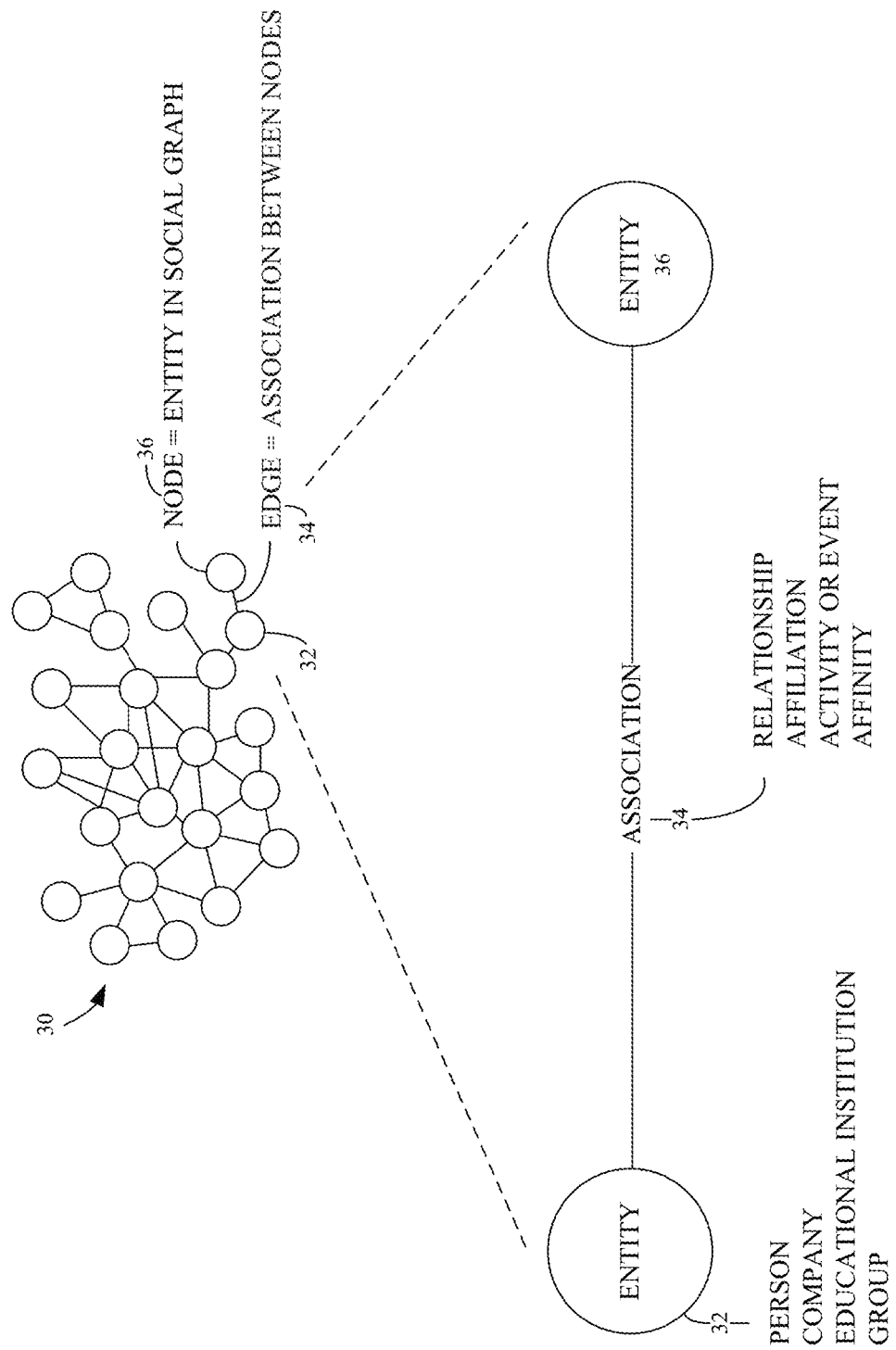
FIG. 2 is a block diagram illustrating an example of a portion of a graph data structure for modeling a social graph, according to some embodiments of the invention.

FIG. 2 is a block diagram illustrating an example of a portion of a graph data structure 30 for implementing a social graph, according to some embodiments of the invention. As illustrated in FIG. 2, the graph data structure 30 consists of nodes connected by edges. For instance, the node with reference number 32 is connected to the node with reference number 36 by means of the edge with reference number 34. Each node in the graph data structure represents an entity in the social graph. With some embodiments, any number of entity types may be included in the social graph. For example, as illustrated in FIG. 2, the entity types that exist in one implementation of a social graph that is consistent with an embodiment of the invention are: a person, a company, an educational institution (e.g., college, school or university), and a group (e.g., an online group, hosted by the social network service, or some other third party server system, or, a real-world organization, such as a professional organization.) The edges that connect any two nodes can represent a wide variety of different associations. For example, in general, an edge may represent a relationship, an affiliation, an activity or event, or some other affinity shared in common between two entities. Although not exhaustive, the various associations presented in the table of FIG. 3 represent some of the many associations that may be mapped to the edges of a social graph data structure to indicate the association between entities in a social graph of a social network service, consistent with some embodiments of the invention.

Referring to FIG. 3, the table with reference number 38 illustrates a non-exhaustive list of associations that may be attributed to an edge connecting two nodes, representing entities, in the social graph data structure. Various edge types or associations may be applicable to all combinations of entity types, while others may be applicable to only a certain subset of combinations of entity types. For example, an edge type representing a "following" relationship may connect two nodes, where each node represents a person, and the edge connecting the two nodes indicates that one person is following the other. Similarly, an edge representing a "following" relationship may connect a first node, representing a person, with a second node, representing a company, to indicate that the person is following the company. Accordingly, the edge type for a "following" relationship applies to the entity type, person, as well as company. Some other associations are only meaningful when applied to an edge connecting certain types of entities.

Some of the various associations or edge types shown in FIG. 3 indicate a particular relationship that exists between two entities represented by nodes in the graph data structure. For instance, two members of the social network service may be directly connected, one member may be following another, one member may be in an address book or contacts list of another, two members may be co-managing a group or co-inventors on a patent, and so forth. In each of these examples, the association or edge type is assigned to the edge connecting the two nodes representing the two entities (e.g., person, company, educational institution, group, etc.)

Some of the various associations or edge types shown in FIG. 3 indicate an activity that is shared in common between two entities, or an activity that involves two entities. For example, a first member may have communicated a message to a second member. A first member may have re-tweeted or forwarded some content item (e.g., a tweet) that was originally generated by a second member. A first member may share an item of content with a second member, or, comment on an item of content posted by a second member, and so forth.

A third category of associations generally involves what may be thought of as affiliations. For example, a member may be affiliated with a company based on current or past employment at the company. A member may be affiliated with an educational institution based on current or past attendance as a student. A member may be affiliated with an online group based on membership in the group.

Another general category of associations or edge types involves what are referred to herein as affinities. For instance, two members may be associated based on an affinity or similarity of profile attributes, such as, the same general geographic location, skills shared in common, employment in the same industry, common degrees or majors, etc. The various associations or edge types that may be assigned to an edge connecting two nodes in a graph data structure presented in FIG. 3 are simply some of the many examples. In various alternative embodiments of the invention, different associations (not shown in FIG. 3) may also be used, particularly with embodiments of the invention that have additional entity types other than the specific examples presented herein (e.g., person, company, educational institution, group).

Figure 4:
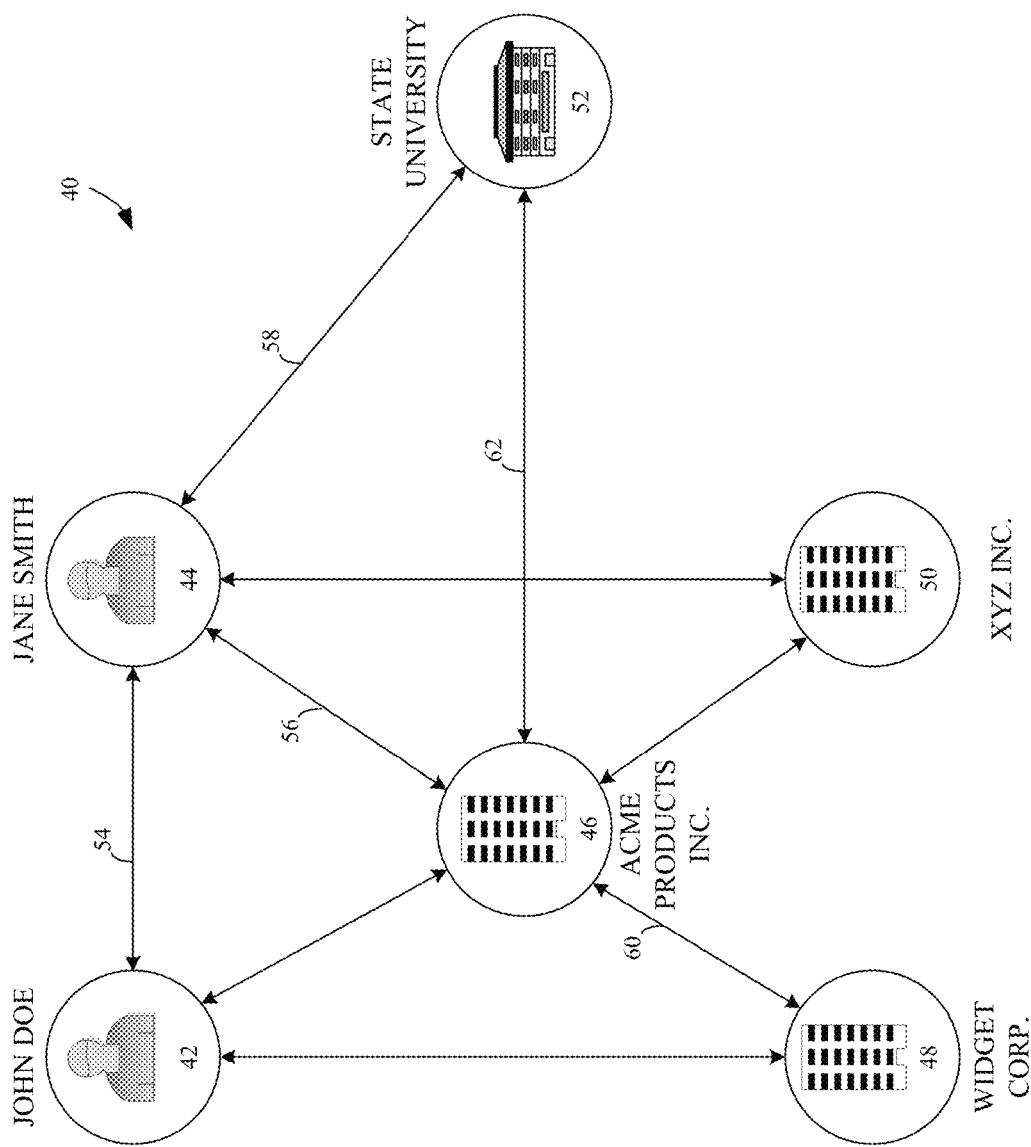
FIG. 4 is a block diagram illustrating an example of a generalized social graph containing nodes of several entity types including members, companies, and schools, consistent with some embodiments of the invention.

FIG. 4 is a diagram illustrating an example of a generalized social graph 40 containing nodes representing several different entities, having varying entity types including members, companies, and schools. Member nodes include John Doe 42 and Jane Smith 44. Company nodes include ACME Products Inc. 46, Widget Corp. 48, and XYZ Inc. 50. There is one school node, State University, with reference number 52. The graph contains edges connecting nodes representing entities of either the same or different types. For example, there is an edge 54 connecting John Doe with Jane Smith, reflecting the fact that John and Jane are directly connected to each other. This edge 54 may be assigned an edge score or weight indicating the strength of the connection between John and Jane. For example, with some embodiments, the weight can be computed using a measure of the overlap between the member connections in John's network and Jane's network. That is, for two members M1 and M2, W(M1, M2)=Conn(M1, M2)/SQRT[Conn(M1) *Conn(M2)] where W(M1, M2) denotes the weight of the edge connecting M1 and M2, Conn(M1, M2) denotes the number of direct member connections that M1 and M2 have in common, Conn(M1) denotes the total number of direct member connections in M1's network, and Conn(M2) denotes the total number of direct member connections in M2's network. Alternatively, the weight for this edge 54 can be determined based on a statistical estimate of the probability that John and Jane know each other, or by other algorithms or techniques or combinations thereof.

Referring again to FIG. 4, there is an edge 56 connecting Jane Smith to ACME Products Inc., which represents Jane's affiliation with ACME Products Inc., as the executive chairman and founder of the company. The score or weight assigned to this edge 56 indicates the strength of this affiliation. For example, with some embodiments, the weight can be computed based on the overlap between Jane's network and the network of ACME Products Inc., where the node in the social graph representing ACME Products Inc. is connected to each member who is a current or former employee of the company. That is, for a member M1 and a company C1, W(M1, C1)=Conn(M1, C1)/SQRT[(Conn (M1)*Conn(C1)] where W(M1, C1) denotes the weight of the edge connecting M1 and C1, Conn(M1, C1) denotes the number of members M1 is connected to who are also current or past employees of C1, Conn(M1) denotes the total number of connections in M1's network, and Conn(C1) denotes the total number of members who are current or past employees of C1. Similarly, there is an edge 58 connecting Jane Smith to State University 52, which represents Jane's affiliation with State University as an alumnus of the university. The weight of this edge indicates the strength of this affiliation. For example, the weight of an edge connecting a member M1 and a school S1 could be computed as W(M1, S1)=Conn(M1, S1)/Conn(M1), where Conn(M1, S1) denotes the number of members M1 is connected to who are also students or alumni of S1, and Conn(M1) denotes the total number of member connections in M1's network.

There is an edge 60 connecting ACME Products Inc., with Widget Corp., which represents the association between the two companies. An association between two companies can exist for a variety of reasons, for example, if they share a common founder, if some members of the social network service have been employed at both companies, if one company is a subsidiary of the other, or if the two companies are business partners. In this particular example, ACME Products Inc. and Widget Corp. are connected because a large number of former Widget Corp. employees are currently employed with ACME Products Inc. The weight of the edge denotes the strength of the association. For example, the weight of an edge connecting two companies C1 and C2 could be computed as W(C1, C2)=Conn(C1, C2)/SQRT[Conn(C1)*Conn(C2)], where Conn(C1, C2) denotes the number of members who have worked at both C1 and C2, and Conn(C1) and Conn(C2) denote the number of members who have worked at C1 and C2 respectively. Similarly, there is an edge 62 connecting ACME Products Inc. with State University, which represents the association between the company and the school. This association can exist for a variety of reasons, for example, if graduates of the school or students at the school are employed by the company. Again, the weight assigned to the edge 62 indicates the strength of the association. For example, the weight of an edge connecting a company C1 with a school S1 could be computed as W(C1, S1)=Conn(C1, S1)/SQRT[(Conn (C1)*Conn(S1)], where Conn(C1, S1) denotes the number of members employed by company C1 who attend or have attended school S1, Conn(C1) denotes the number of members employed by C1, and Conn(S1) denotes the total number of members who attend or have attended S1.

Figure 5:
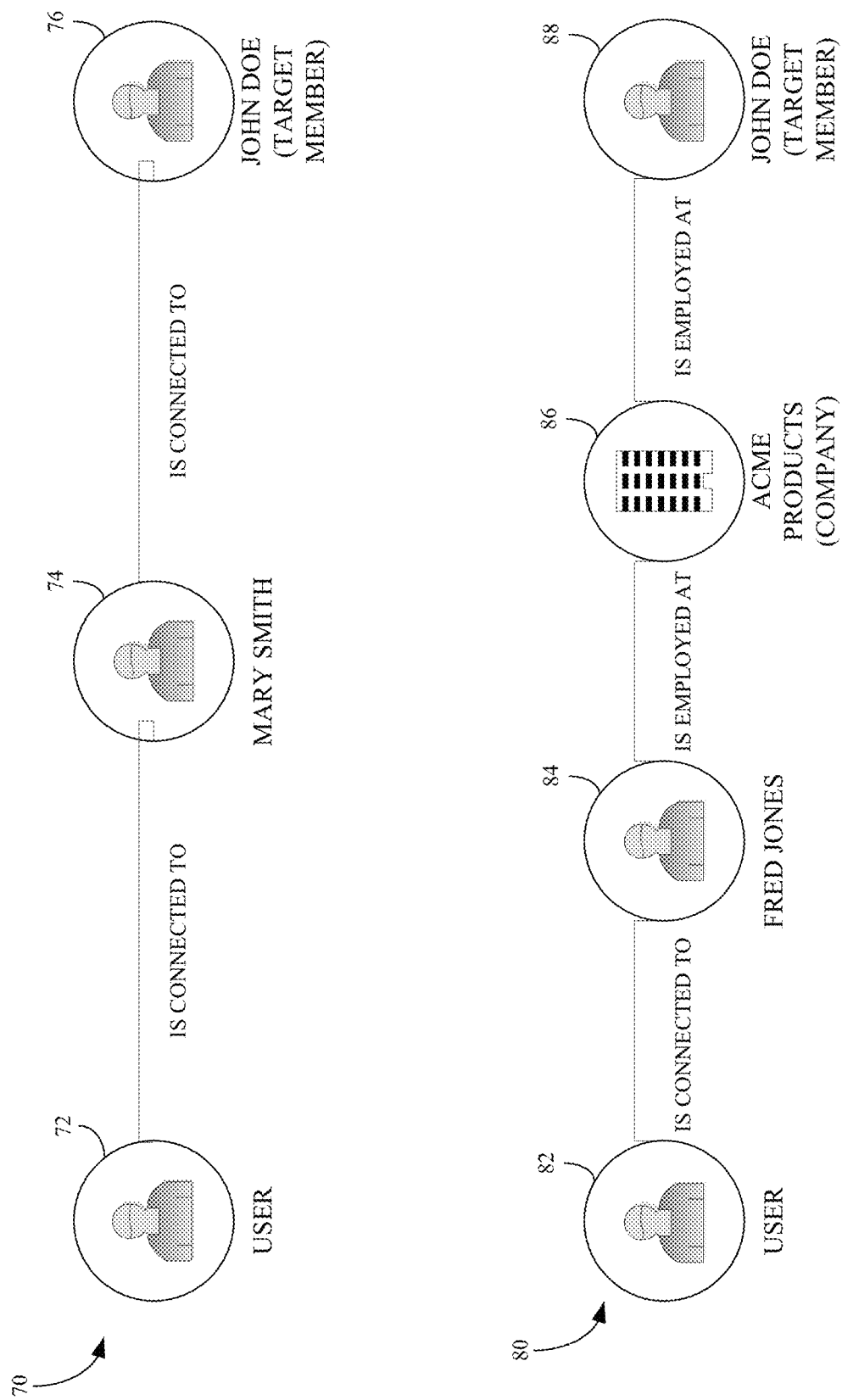
FIG. 5 is a block diagram illustrating some examples of connection paths in a social graph connecting a user with a target member, consistent with embodiments of the invention.

FIG. 5 is a block diagram illustrating some examples of connection paths in a social graph connecting a user with a target member, consistent with embodiments of the invention. As the term is used herein, a "connection path" is simply a nodal path through a graph data structure that connects two specific nodes (entities in a social graph). Referring to FIG. 5, in the example connection path with reference number 70, the user, who is represented by the node with reference number 72, is directly connected to the member, Mary Smith, represented by the node with reference number 74. In turn, Mary Smith is directly connected to the target member, John Doe, represented by the node with reference number 76. In this relatively straightforward and simple example, only a single node 74 separates the user 72 and the target member 76, and only one edge type (i.e., a direct connection) is involved.

In the example connection path with reference number 80, the user, represented by the node with reference number 82, is directly connected to the member, Fred Jones, represented by the node with reference number 84. In turn, Fred Jones is an employee of the same company (e.g., ACME Products Inc., represented by the node with reference number 86) at which the target member, John Doe (node with reference number 88), is employed. Accordingly, this example connection path 80 involves two different node types (e.g., a person and a company), and two different edge types (e.g., a direct connection and an employment relationship).

Given the various associations that may exist between entities, for example, as set forth in the table of FIG. 3, it is readily apparent that in many instances, there may be a significant number of connection paths connecting two persons, or an entity (e.g., a company) with a person, such that one or more of the connection paths may not be obvious or immediately apparent to the user. Furthermore, as these two different example connection paths 70 and 80 make apparent, the entity and edge types or associations involved in a particular connection path will often make one connection path more relevant with respect to a particular task or objective than another connection path. Accordingly, with some embodiments of the invention, after identifying a set of connection paths connecting a user with a target member, or, a user-specified entity with a target member, the pathfinder module will generate a path score for each connection path identified. With some embodiments, the path score for each individual connection path will be dependent upon the individual edge scores assigned to the edges connecting the nodes in the connection path. With some embodiments of the invention, different algorithms may be automatically used to derive path scores for different applications or tasks. The particular algorithm used to derive the path score may be automatically and dynamically selected, for example, based on a determination of what the user is attempting to achieve. Alternatively, with some embodiments, the user may make an explicit selection (e.g., by specifying a type or category of message, or, a purpose for contacting someone), which will then influence the algorithm used to derive the path scores. Consequently, the edge scores or weights for different edge types may be derived differently, for example, to increase or decrease the influence of edge scores of certain types of edges on the path score, depending upon the particular application that has invoked the pathfinder module, or a particular task or process being undertaken or performed.

With some embodiments, the application invoking the pathfinder module may filter the connection paths output by the pathfinder module, or modify the scores or ordering of the connection paths, by using additional methods or algorithms that customize the output of the pathfinder module for the needs of the particular application. For example, an application that identifies intermediate members in a social network who may be able to introduce the user to a target member could adjust the scores of the intermediate members based on data concerning the historical or past activities undertaken by those members within the context of the social network service.

Figure 7:
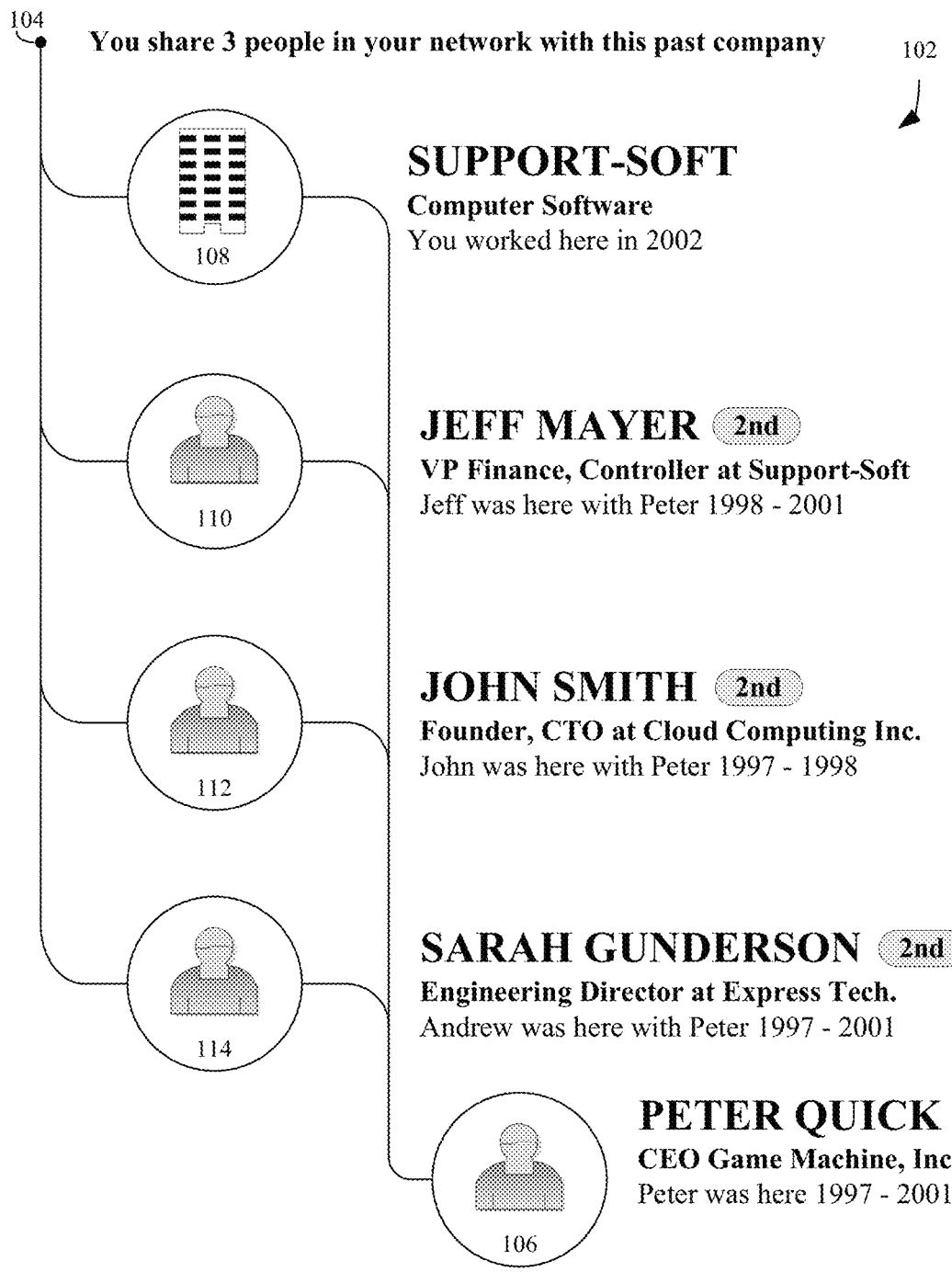
Figure 8:
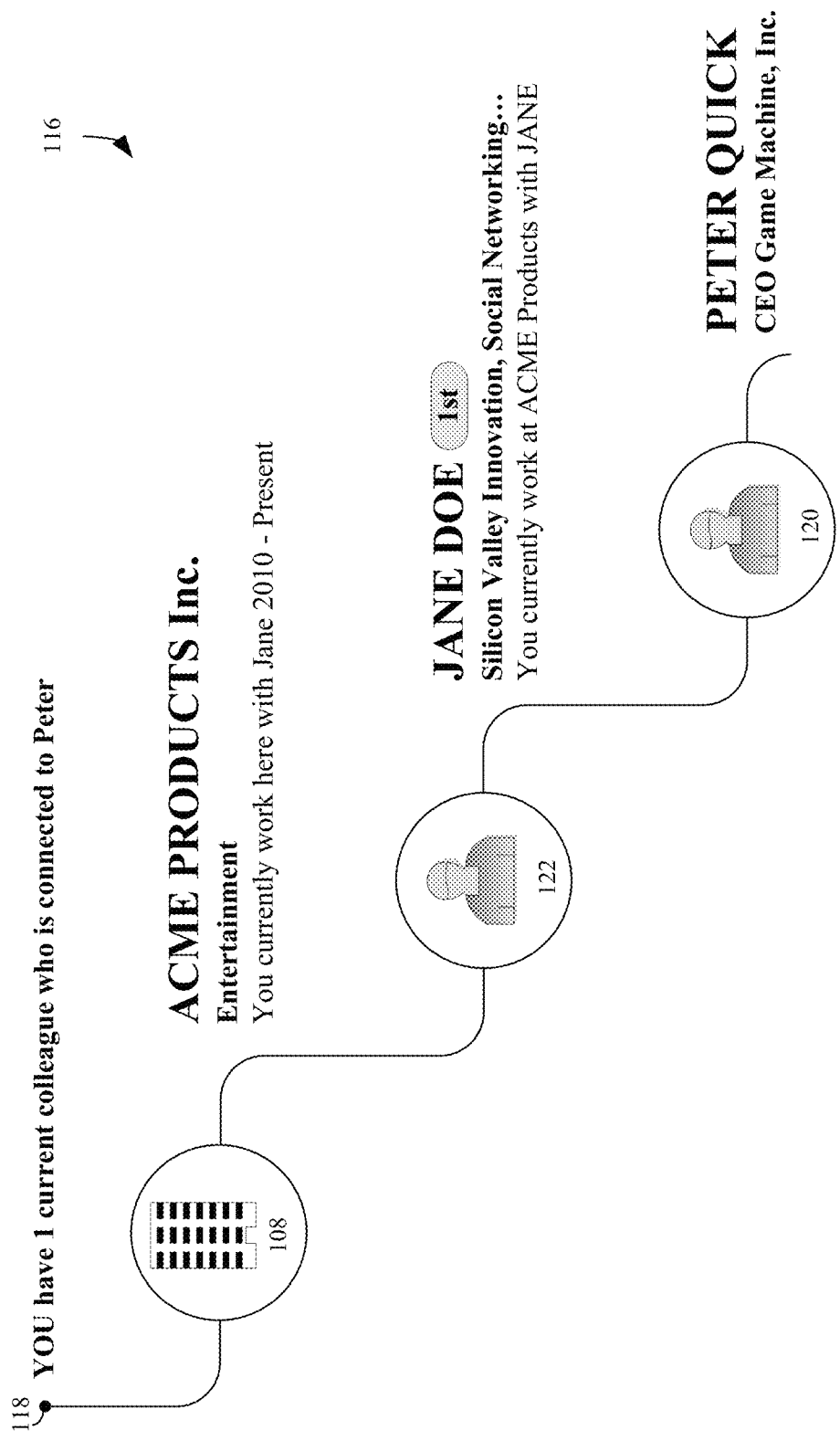

The presentation of the visual representation of the connection path or paths can vary significantly from one application to the next, and from one embodiment of the invention to the next. Without any intent to limit the scope of what is claimed, FIGS. 6 through 8 present various examples of user interfaces that convey a visual representation of connection paths in a social graph connecting a user with a target member, consistent with some embodiments of the invention. These example user interfaces represent user interface elements that might be used in any type of application to present contextual information concerning a connection path between a user and another member of a social network service.

As illustrated in FIG. 6, the example user interface 90 shows a visual representation of three different connection paths having an equal number of nodes (e.g., entities) and the same type of edges (e.g., association). Specifically, in this example, the user represented by "YOU" has seven direct connections (e.g., person-to-person relationships established via the social network service) that are also directly connected to the target member 98. Of those seven connections, three are visually presented in the user interface element while the other four are accessible to the user via the button or link 100 corresponding with the text, "SEE 4 MORE." With some embodiments, when multiple connection paths exist with the same number of nodes and the same edge types, all or a specific subset of the connection paths may be presented in parallel, as shown in FIG. 6. Generally, the order in which the connection paths are presented will be dependent upon the connection strength, as indicated by the path score derived for the various connection paths. For instance, in the example of FIG. 6, the connection path including the node with reference number 92 is presumed to be a stronger, or more relevant, connection path than the connection path including the node with reference number 94, or the connection path including the node with reference number 96 for the same reason, i.e., given the order in which the connection path with node 96 is presented.

While the connection paths associated with the user interface element of FIG. 6 involve a direct connection as an edge type, the visual representation of the connection paths corresponding with FIG. 7 involve an employment relationship with a company. Specifically, the user interface element 102 shown in FIG. 7 indicates that the user (represented by the point with reference number 104) has three people in his broader network (e.g., within the social graph) who are connected to the target member and who were at one time or another employed with the same company at which the user and the target member (e.g., Peter Quick, with reference number 106) were at one time employed. In this example, the company (e.g., Support-Soft.) is represented by the user interface element with reference number 108, while the individual members, and thus the separate connection paths, are represented by the user interface elements with reference numbers 110, 112 and 114. In this particular example, as indicated by the textual descriptions positioned next to each user interface element that corresponds with a node from the social graph, the members forming the connection path to the target member 106 are second level, or second degree, connections of the user 104. With some embodiments, the user may interact with the individual user interface elements 110, 112, 114, for example, by manipulating a cursor control device or interacting with a touch sensitive display, to select or hover over a user interface element, causing additional information to be presented. The additional information may include information concerning the various first level, or first degree, connections, who the user 104 shares in common with the members represented by the user interface elements with reference numbers 110, 112, and 114, forming the connection paths with the target member 106, as shown in FIG. 7.

FIG. 8 illustrates a third example of a user interface 116 that includes a visual representation of a connection path, consistent with some embodiments of the invention. As illustrated in FIG. 8, the connection path from the user 118 to the target member 120 involves a current colleague of the user 122, who is directly connected to the target member 120. For example, the user is represented in the connection path by the circle with reference number 118. Both the user and Jane Doe, represented by the user interface element with reference number 122, are currently employed at the company, ACME Products, Inc. 108, and Jane Doe is a direct connection of the target member, Peter Quick 120.

The particular user interfaces shown in FIGS. 6, 7 and 8 are simply examples of how a connection path may be conveyed in accordance with some embodiments of the invention. The particular examples might be used as a portion of a user interface for any number of different applications. Other embodiments of the invention may use visual representations of the connection path that differ from those shown in FIGS. 6, 7 and 8. Specifically, with some embodiments, a visual representation of a connection path may not include any parallel paths, but instead, each individual connection path may be shown as a series of nodes representing different entities. With some embodiments, only a subset of the nodes in a particular connection path may be visually represented. Alternatively, with some embodiments, each and every node in a connection path is included in the visual representation.

Account Prioritization Ranking and Representative Assignment

Although discussed herein in terms of a method, the same discussion may be made in terms of a system and of an article of manufacture. As used herein, the term "internal" is applied to organizations such as a sales organization, and may also include distributors for the organization who, while not technically internal to the organization, may in some instances be considered as internal resources. Further, the terms "prospective account" and "account" may be used interchangeably herein. Likewise, "representative" and "account executive" may also be used interchangeably herein. Further still, while "representative" and "account executive" have the connotation of members in a sales organization, this is used merely as one example. Other embodiments would naturally be applicable to service and support representatives as well, and the prioritization activities discussed here may also scale into marketing as well.

Business organizations have limited resources and seek ways to determine how best to use those resources. Sales organizations desire to determine the best prospects to sell to and when to sell to them. Also, given a set of internal resources available to an organization, and given an available number of things that those resources can focus on, the question arises how to prioritize the available leads or customers, viewed as external contacts, and then to which resources internal to the sales organization should the external contacts be allocated or assigned. This may be viewed, in one embodiment, as how best to manage sales staff which may be a group of people that are focused on marketing and sales and their function, in order to maximize their impact in a broad way. An embodiment may prioritize companies by ranking them by prospective spend on a given product, or on a given matter, perhaps in a descending order of prospective spend. Further, since it is people who purchase, the embodiment may also, in addition to ranking companies by spending propensity, determine what person or persons at a prospect may influence the execution of a given matter, such as a person who would decide whether to make a purchase. This influencer would be the person a sales organization would generally like to contact. Such an influencer may be determined by searching the social network profiles, and social graphs of persons employed by the company who are members of the social network service. Further, the social graph of the social network itself may be used in the prioritization. As one example, if the profile of the member indicates that the member is the Chief Marketing Officer at the company, that person is highly likely to be an influencer. In one embodiment this may be determined by searching the titles of the profiles of the members. Stated another way, it is desirable to find which person employed at an account is either going to be a key influencer or is going to be the actual decision maker (the terms "key influencer" and "decision maker" may be used interchangeably herein) that can decide to execute a particular sale as quickly as possible. Embodiments herein may use of a mix of profile data, engagement or social graph activity, or social network data to determine a person's influence on a particular matter. In some embodiments social graph activity may be detected by determining emails between members, such as by using the email application discussed above. These social graph data, profile data, and social network activity may be combined together to create a way to rank external people (at the prospective account) who are members of the social network, to be used for contacts, and to rank internal people (at the sales organization), who are also members of a social network, to assign contacts to, or for help in establishing contacts, or for introductions to contacts. The social network service itself may be the employer of the sales organization, using member profiles, member social graph activity, and the social graph of the social network service itself for prioritization that may lead to making sales. In addition, a sales organization that is separate from a social network service may use the social network service for the foregoing sales purposes. Embodiments herein may help determine which companies to approach, which people at those companies to approach, and which people internal to the sales organization are best suited to approach those people.

As examples of using the above method, a sales organization may have several businesses it sells through. One example may be a hiring solutions business which sells recruiting solutions;

another may be a marketing solutions business which sells ads and related items; another may be a sales solutions business that sells products to sales people for helping to make sales. In each case there are usually corporate buyers and the embodiments herein may be used to find corporate decision makers who have buying power or who influence buying power, who can write a meaningful sized check for a sale.

As an example, a law firm may want to market to general counsel of corporations around the web. A sales organization may market a product that can find corporate general counsel for law firm marketing purposes. One way this may be performed is to approach the law firm offering to sell or, more appropriately, to license an advertising product that can find corporate general counsel for that law firm. The method may prioritize to find the person in the law firm who is in charge of marketing the law firm's legal services, such as the firm's Chief Marketing Officer ("CMO") which may be viewed as an external prioritization. Having found the CMO, the determination may be made which person on the sales team is most suited to approach the law firm CMO. This may be viewed as an internal prioritization. This internal prioritization may be based, for example, on the fact that a person on the sales team may have a law degree, or that a person is connected to five lawyers on a social network service, which indicates a social proximity that may enable the person to be likely to be a good, or perhaps even an optimal, person to interface with lawyers. A map may be constructed between the external prioritization and the internal prioritization. This prioritization may be integrated into the sales organizations customer relations management software as a ranking score for use, in one embodiment, at the beginning of each year, or at other times, for individual sales representatives to obtain needed sales prospect information.

In one embodiment, implementing external prioritization provides estimates (in U.S. dollars) of how much an account could spend annually with a sales organization on products offered by that organization. This may be based upon the behavior of the sales organization customers of recruiting products as determined by social network activity of employees of an account, as discussed above in this patent.

As only one example, using data of a social network service, scoring of accounts may be based on three factors. One may be the number of employees who joined the account from a different organization in a given time period. A second may be how many employees of the account serve a recruiting-related role as indicated by coding titles such as "recruiting," "talent," and the like in the social network service's data from member profiles. A third may be determining which industries have the highest usage of the social network service and which industries the sales organization has penetrated historically.

Figure 9:
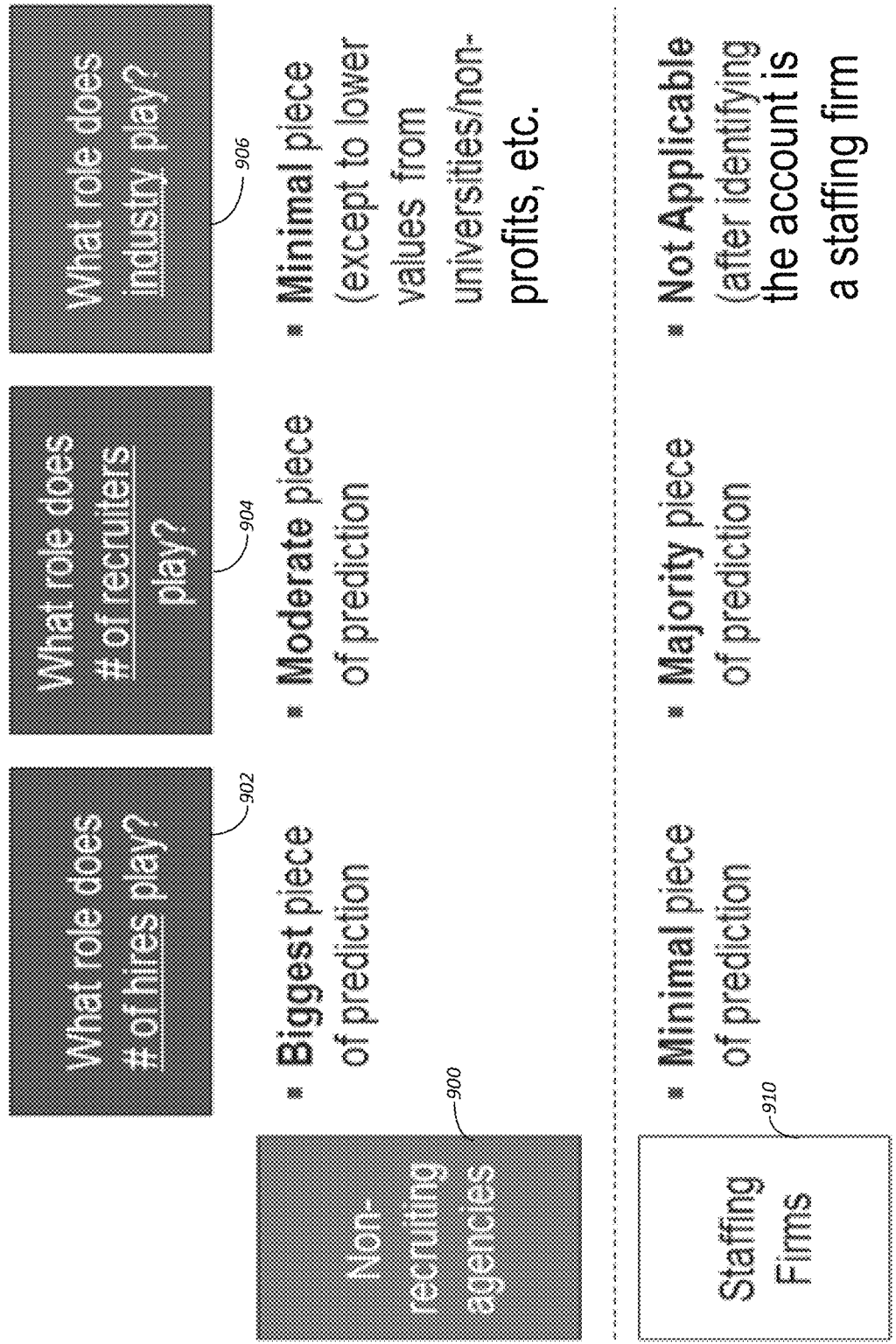
FIG. 9 is an illustration of how prospective account ranking operates in an embodiment.

FIG. 9 illustrates the relationship between number of hires, number of recruiters, and industry, all of which can be determined from member profiles in a social network service, as a function of the type of accounts. For example, if the account is a non-recruiting agency 900 such as a manufacturing corporation, as one example, the number of hires 902 may be the biggest factor in ranking. The number of recruiters 904 may be a moderate factor, and the actual industry 906 of the account may be only a minimal factor. On the other hand, if the account is a staffing firm as at 910, the number of hires 902 may be a minimal factor, the number of recruiters 904 may be the major factor, and the industry 906 may not be serious factor.

The sales organization may determine a procedure to translate number of hires, number of recruiters, and the number of members in a social network to a dollar amount in order to rank prospective accounts by prospective spend. For example, a dollar multiplier may be placed on the number of hires (where the multiplier may depend upon the historical dollar volume of the account which the sales organization has in its database), the number of recruiters, and the number of members. The multiplier depends on the sales organization. As an example, Company A makes one hundred (100) hires per year, has twenty (20) recruiters, and has one thousand (1000) members on the social network, which data is available on the social network service. The sales organization may believe each hire in Company A is valued, for sales purposes, at $1000 and that company A's prospective spend is therefore $100,000. In this example there are five (5) hires for every recruiter. The ratio is 5:1. As another example, Company B makes one hundred (100) hires per year, has two (2) recruiters, and has one thousand (1000) members on the social network. The sales organization believes each hire in Company B is valued at $750 and that the company's prospective spend is $75,000. Company B has only two (2) recruiters versus twenty (20) recruiters for Company A and therefore the sales organization may believe Company B is less lucrative than Company A and may marshal its resources accordingly.

A screenshot of a user interface 1000 displaying prioritization is illustrated in FIG. 10 where companies have been prioritized by prospective spend. As can be seen, ID#1680, the company Cognizant-Technology-Solutions 1010 is prioritized as first. The Company's number of hires (6,143), number of members on the social network (52,599), and number of recruiters (200) are used in a calculation as discussed above, ranking the estimated value (prospective spend) as $2,276,513. The other companies are prioritized accordingly with 1-3 Communications 1020 ranked next at 2810, and so on. Again, these numbers are found by path finding the social graph of the social network organization and of the members as discussed above, and the prospective spend may be calculated from these numbers in a manner similar to that discussed.

As a further operation in the method, it is desirable to find which person employed at an account is either going to be a key influencer or is going to be the actual decision maker that can decide to execute this sale as quickly as possible. As discussed previously, this may be accomplished by using social graph data, profile data, and the relationship and engagement among members of the above social network service as discussed above in this patent. The key decision maker or influencer may be based upon titles of the account members on the social network, and also their engagement with the sales organization. This may identify the person who is the optimum, or a highly effective, entry to the account. FIG. 10A is a screen-shot 1002 that shows how these results may look. In this example, a sales organization wishes to sell to LinkedIn™ and the results show the rank-ordered list of people the sales organization believes it should call in a prospective client (hypothetically LinkedIn) in order to sell recruiting products. The same type of result would occur for other companies used as an example of the company that is being sold to. This may vary based on the weight given to factors such as connectedness and influence in a particular embodiment. If greater weight is given to influence in an embodiment, Jeff Wang 1040, who is Head of Organization and Staffing-APAC, would be the key person in this example because his influence and engagement is judged to be higher and he is likely to have a higher likelihood for being key to closing the particular deal. If, on the other hand, more weight is given to connectedness, Patrick Cronin 1060 would be the key person, given his higher number of connections.

Determining the organization chart of the company, or determining titles of members, may find the critical person for use in a user interface such as FIG. 10A above. Determining an organization chart may be accomplished as discussed in U.S. patent application Ser. No. 13/756,142, filed Jan. 31, 2013, entitled "Techniques for Inferring an Organizational Hierarchy from a Social Graph," assigned to the assignee of the present patent, and incorporated by reference in its entirety.

Figure 11:
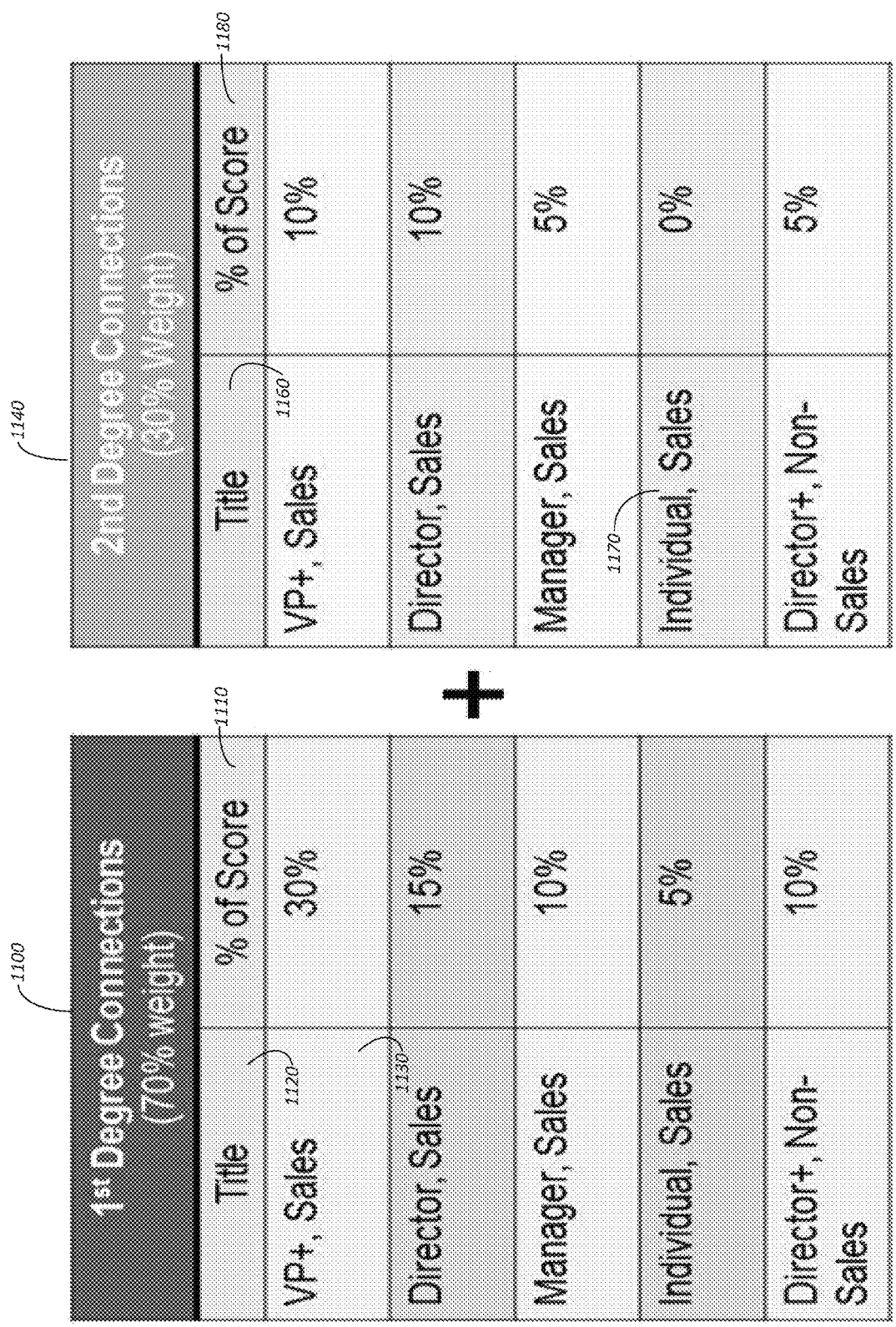
FIG. 11 illustrates first degree and second degree social network service connections between a sales organization representative and certain high level employees of a prospective account in an embodiment.

The foregoing discussion relating to evaluating prospective spends and determining a key influencer at the prospective account may be viewed as external ranking. The method may then perform internal ranking, to rank internal personnel at the sales organization who may be the best persons to approach the account, or to help the assigned representative approach the account. This may be done by determining who from the sales organization has in, one embodiment, first or second degree connections to the account. This may be viewed as a social proximity which may be derived from the social network service that has employees of the account and employees of the sales organization as members. The social proximity may be used to assign the best, or an optimum, account executive in the sales organization to the account. This may be done by calculating a proximity score by measuring how connected an account executive is to a company via first and second degree connections on the social network service. This may be focused on the connections to persons at the account. First degree connections may be given higher weighting than second degree connections due to the difference in closeness of the two types of connections, with the high social proximity accounts then assigned to the most connected account executive. Alternatively, social proximity may be based on influence. In FIG. 11 the first degree and second degree social network service connections 1100 and 1140, respectively, between a sales organization account executive and certain high level employees of a prospective account are shown. In this example, each internal sales person's overall influence on each of the external accounts may be calculated using a summary of SSI score, in an effort to assign sales people to the right accounts. An embodiment may give more weight, indicated at 1110 as percent of the score, to first degree connection relationships between an account executive and the more senior contacts 1120 at a target company, for example, Vice Presidents, 1130. Relationships that are second degree connection relationships 1140 or where the contact 1160 is less senior (e.g., an individual contributor 1170 who is less likely to have less influence on a buying decision) may be given less weight 1180. Further (not shown in FIG. 11), social proximity may also be measured not only on explicit connections such as connections between two members of the social network, but also on inferred connections based on overlaps in experience between two members of the social network. Similarly, social proximity may be measured based on the number of common connections of two members with another member. All of this may be found by interrogating the profiles and social graphs of the members of the social network. The result in some instances may be that an account might be allocated not to the member with the highest score, but the allocation would be one that maximizes social proximity overall.

Figure 12:
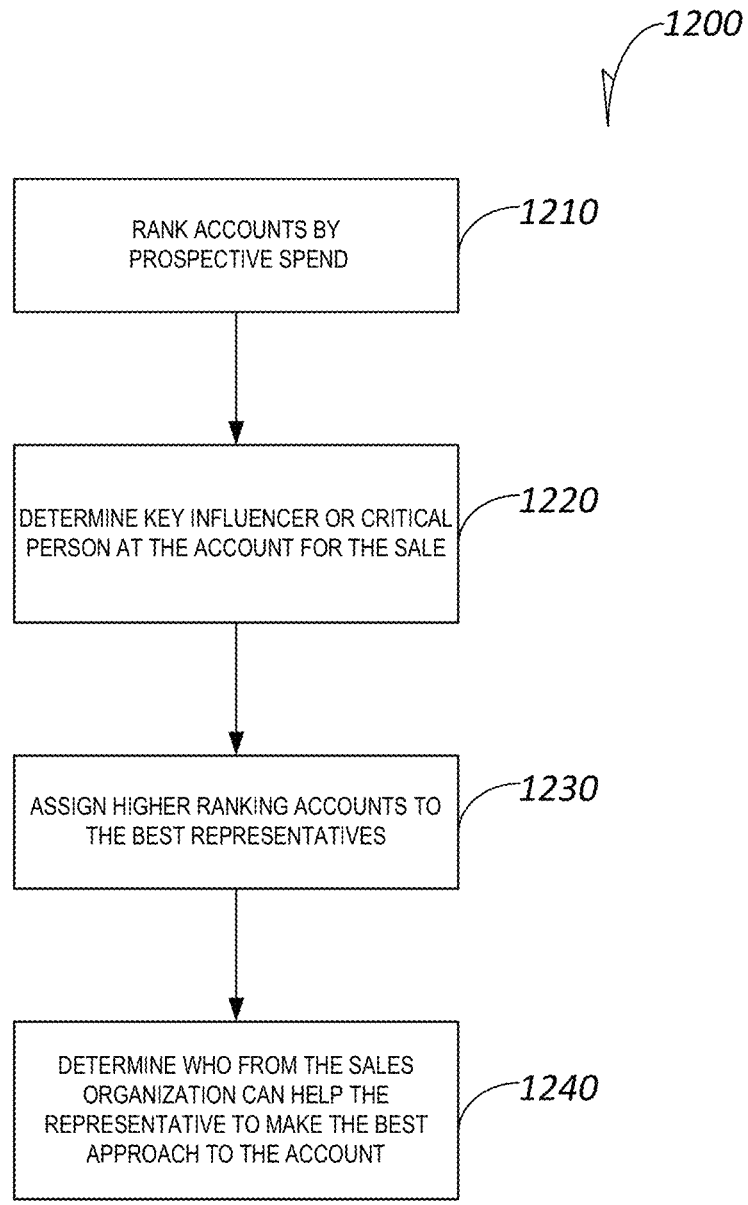
FIG. 12 is a flowchart illustrating a method of one embodiment.

FIG. 12 illustrates flowchart illustrating the method 1200 such as discussed above. At 1210 the accounts are ranked by prospective spend as discussed above with respect to FIG. 10. In addition, the key influencer at the account may be determined at 1220 as discussed above. One of ordinary skill in the art will understand that the operations 1210 and 1220 need not be performed in the sequence illustrated but that either operation may be performed first, or in fact they may be performed concurrently. At 1230 the method may assign higher ranked accounts to the representatives who are best connected to, or have high or highest social proximity to, the accounts, which may be done using data internal to the sales organization, such as the social proximity index discussed above. At 1240, the method may, if desired, determine who from the sales organization can help the representative to make the best approach to the account. This may be performed, as discussed above, by determining connections and social proximity among the key influencer and members of the social network who are employees of the sales organization. Many relationships may be tested for to measure social proximity, including friends, school classmates, professional organizations at which employees of the sales organization and the influencer are both members, all of which can be determined by use of the social network. Ways to determine the above relationships are as discussed above. In this manner embodiments could find the representative in the sales organization that has the most connections to the key influencer, in which case the representative might be the right person to assign the account to, or might be the right person to help in implementing the cleanest, smoothest, least friction path to approaching the key influencer. As mentioned above, an account might be allocated not to the member with the highest connection score. Instead, the allocation that maximizes the overall social proximity may be made.

Sales Triggers

Figure 14:
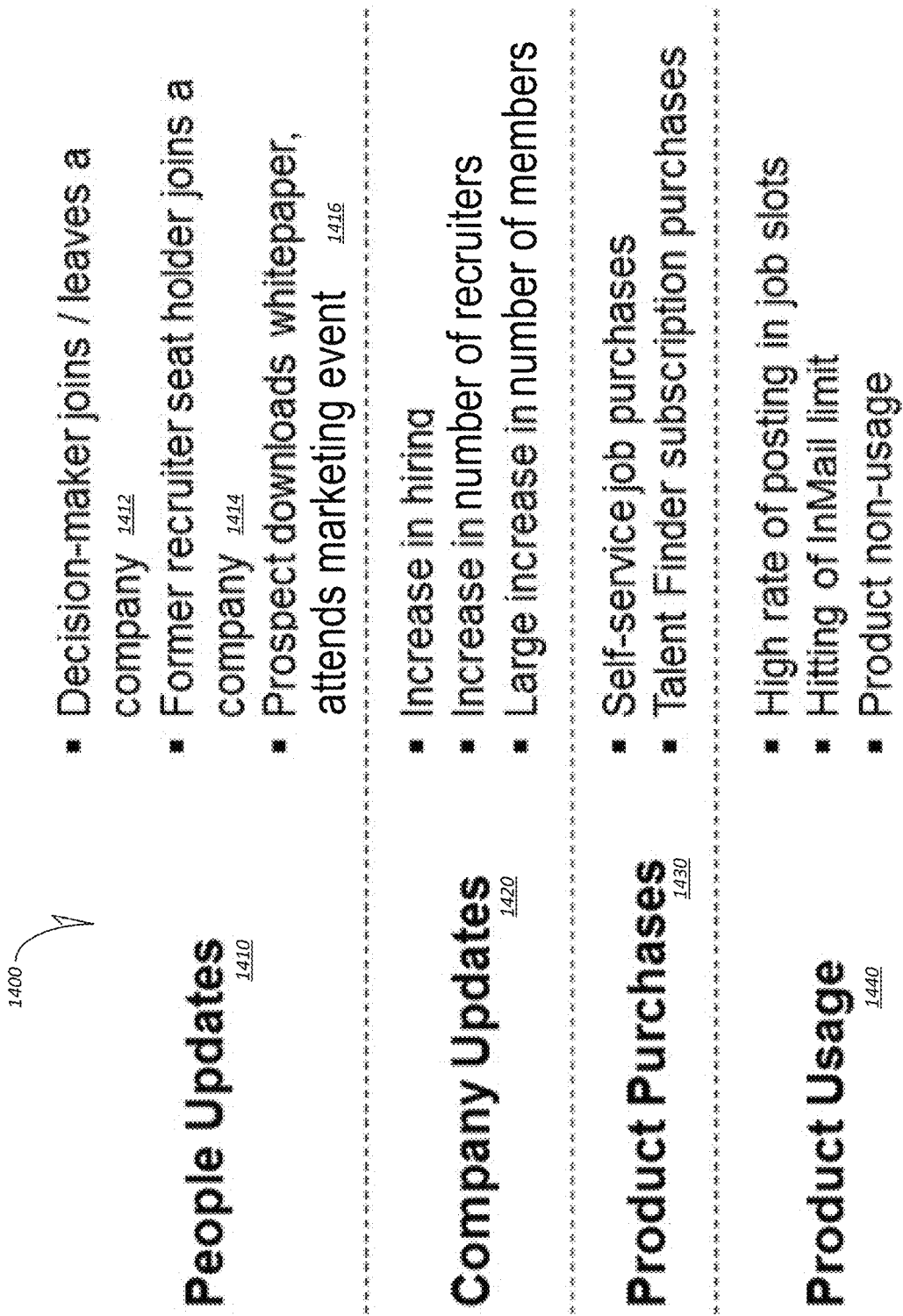
FIG. 14 is an illustration of sales triggers in an embodiment.

If the prioritization function discussed above were static, with no provision to alert sales representatives to hiring activity changes or real-time personnel movement in accounts, and the like, sales representatives may miss important events in their accounts. One such event may be that a key decision maker switched from one account to another account, or that four former users of a particular product now work at the representative's account, or the account may have doubled hiring in the last three months. Similarly, the representative may not be calling on the account at the right times. For example, is there a hiring cycle to track at the account? Is there a budget cycle? Is the account posting new jobs or buying a product that indicates they are hiring. Is the account's usage of or impact on the social network service increasing or dropping? To stay fully cognizant of accounts and determine an appropriate time or manner to make a call, representatives need to constantly rerun searches and/or interrogations such as those discussed above to learn some of the foregoing information, which is inefficient. However, social network and customer relations management software include data sources that are dynamic and constantly updating to create new potentially relevant signals every day. Therefore, an event-based account management tool can be implemented that will offer "real-time" insight alerts or "triggers" to enable trigger-based selling and increase representative effectiveness. A goal might be that representatives learn of relevant updates and adapt sales approaches accordingly. The event based account management tool using the social network may be adapted to sync directly with a priority framework that may be used by the sales organization, such as that framework 1300 illustrated in FIG. 13, which illustrates the prioritization ranking similar to that of FIG. 10, with alerts 1310, 1320, 1330, 1340 of FIG. 13, which may be viewed as being triggers, displayed in real, or nearly real, time. FIG. 14 illustrates one embodiment in which triggers are provided in four categories, although one of ordinary skill in the art will recognize that more or fewer categories may be provided. In FIG. 14, four categories 1400 include people updates 1410 such as a decision maker joining or leaving a company as at 1412, a former recruiter joining a company as at 1414, or a prospect downloads a white paper or attends a marketing event as at 1416. Each of these may be recorded as an event on the social network service, and can be detected as triggers in nearly real time by searching member profiles in the social network. In this embodiment, detecting one of the above events 1410, 1412, 1414, 1416 may be inserted as triggers in FIG. 13. The trigger types illustrated on FIG. 14 are People Updates 1410, Company Updates 1420, Product Purchases 1430, and Product Usage 1440 and may be provided by detecting them among profiles or actions of members who are employed by accounts or potential accounts on the social network service. Further, the triggers may be centralized into a sortable list and prioritized based on the magnitude and importance of the account to a particular representative. The triggers may also be speeded up by feeding them to the sales organizations customer relations management system, again resulting in the user interface of FIG. 13.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 15:
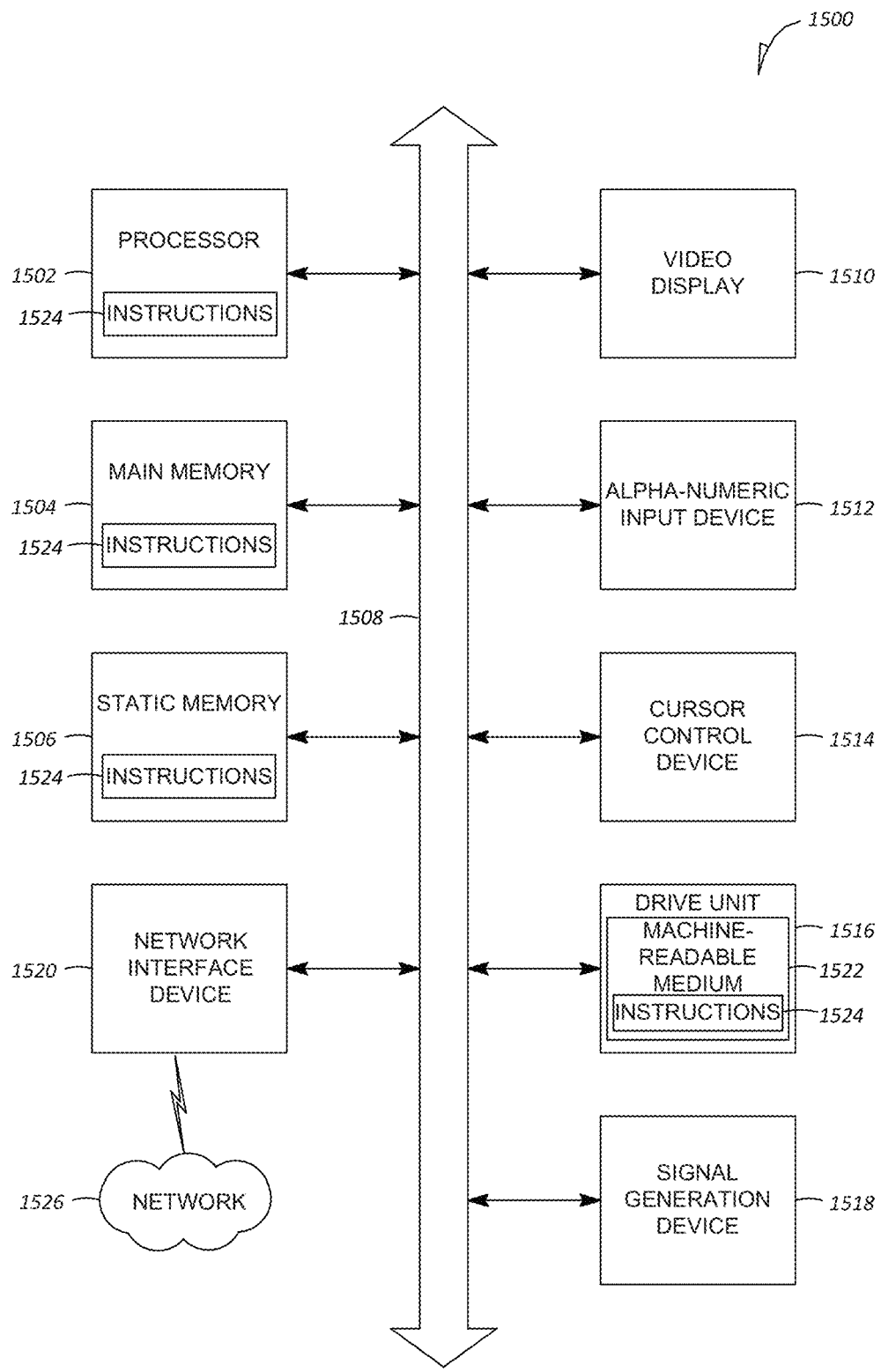
FIG. 15 is a block diagram of a machine in the form of a computing device within which a set of instructions, for causing the machine to perform any one or more of the methodologies discussed herein, may be executed.

FIG. 15 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both) for processing instructions 1524, a main memory 1504 and a static memory 1506 which may store data as well as instructions 1524, which memories communicate with each other via a bus 1508. The computer system 1500 may further include a display unit 1510, and an alphanumeric input device 1512 (e.g., a keyboard. In one embodiment, the display, input device and cursor control device are a touch screen display. The computer system 1500 may additionally include a cursor control device 1514 (e.g., a mouse), a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions 1524 and data structures (e.g., software) embodying or utilized by any one or more of the methodologies or functions described herein. The software may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method of providing alerts that relate to a prospective customer, the method comprising:

ranking, by at least one computer processor, prospective customers of a sales organization by analysis of social network profile data of employees of prospective customers, the ranking based on an estimate of amounts of funds that individual ones of the prospective customers could spend on a given matter in a first time period;

displaying on a first user interface a ranked list of prospective customers of the sales organization;

identifying employees of the ranked prospective customers who are likely transaction influencers at the prospective customers, the identifying based on the analysis of social network profile data of the employees of the prioritized prospective customers;

displaying, on one of the first user interface or a second user interface, a list of likely transaction influencers at the prospective customers;

ranking employees of the sales organization by social proximity to the displayed transaction influencers, the ranking based on the analysis of social network profile data of the likely transaction influencers and social network profile data of employees of the sales organization;

displaying at one of the first user interface, the second user interface, or a third user interface, a list of employees of the sales organization by social proximity to the displayed transaction influencers;

continuously searching the social network profile data of the employees of the prospective customers, by at least one computer processor, to detect a plurality of trigger events, the trigger events comprising events that relate to updates about the transaction influencers, updates about product purchases at the prospective customers, or updates about an increase or a decrease in social network usage at the prospective customers, and placing the detected plurality of trigger events into a sortable list that is prioritized based on business entities and the likelihood of the trigger events to lead to making sales to the business entities;

displaying the sortable list on one of the first user interface, the second user interface, the third user interface, or a fourth user interface;

automatically and dynamically detecting changes to ones of the plurality of trigger events;

automatically and dynamically updating the sortable list based on the dynamically detected changes to ones of the plurality of trigger events; and feeding the sortable list into a customer relations management system to assign respective employees of the sales organization as a representative to ones of the prospective customers based on at least one of the rank of the prospective customer, the social proximity of employees of the sales organization to the likely transaction influencers, or the dynamically updated sortable list of trigger events.

2. The method of claim 1 wherein searching the social network profile data comprises searching member profiles to detect member activities.

3. The method of claim 1 wherein the customer relations management system presents the trigger events on a user interface.

4. The method of claim 1 wherein one or more of the plurality of trigger events comprise elements of a plurality of types of triggers.

5. A system comprising:
at least one computer processor and computer storage configured to:
rank, by the at least one computer processor, prospective customers of a sales organization by analysis of social network profile data of employees of prospective customers, the rank based on an estimate of amounts of funds that individual ones of the prospective customers could spend on a given matter in a first time period;
display on a first user interface a ranked list of prospective customers of the sales organization;
identify employees of the ranked prospective customers who are transaction influencers at the prospective customer, the identification based on the analysis of social network profile data of the employees of the prioritized prospective customers;

display, on one of the first user interface or a second user interface, a list of likely transaction influencers at the prospective customers;

rank employees of the sales organization by social proximity to the displayed transaction influencers, the rank based on the analysis of social network profile data of the likely transaction influencers and social network profile data of employees of the sales organization;

display at one of the first user interface, the second user interface, or a third user interface, a list of employees of the sales organization by social proximity to the displayed transaction influencers;

continuously search the profile data for a plurality of trigger events, the trigger events comprising events that relate to updates about the transaction influencers, updates about product purchases at the prospective client, or updates about an increase or a decrease in social network usage at the prospective customer, and place the detected plurality of trigger events into a sortable list that is prioritized based on business entities and the likelihood of the trigger events to lead to making sales to the business entities;

display the sortable list on one of the first user interface, the second user interface, the third user interface, or a fourth user interface;

automatically and dynamically detect changes to ones of the plurality of trigger events;

automatically and dynamically update the sortable list based on the dynamically detected changes to ones of the plurality of trigger events; and feed the sortable list into a customer relations management system to assign respective employees of the sales organization as a representative to ones of the prospective customers based on at least one of the rank of the prospective customer, the social proximity of employees of the sales organization to the likely transaction influencers and the dynamically updated sortable list of trigger events.

6. The system of claim 5 wherein search of the profile data comprises search of member profiles and search of member activities.

7. The system of claim 5 wherein the customer relations management system presents the alerts on a user interface.

8. The system of claim 5 wherein one or more of the plurality of trigger events are elements of a plurality of types of triggers.

9. A machine-readable storage device having embedded therein a set of instructions which, when executed by a machine, causes execution of operations comprising:
ranking prospective customers of a sales organization by analysis of social network profile data of employees of prospective customers, the ranking based on an estimate of amounts of funds that individual ones of the prospective customers could spend on a given matter in a first time period;
displaying on a first user interface a ranked list of prospective customers of the sales organization;
identifying employees of the ranked prospective customers who are likely transaction influencers at the prospective customers, the identifying based on the analysis of social network profile data of the employees of the prioritized prospective customers;
displaying, on one of the first user interface or a second user interface, a list of likely transaction influencers at the prospective customers;
ranking employees of the sales organization by social proximity to the displayed transaction influencers, the ranking based on the analysis of social network profile data of the likely transaction influencers and social network profile data of employees of the sales organization;

displaying at one of the first user interface, the second user interface, or a third user interface, a list of employees of the sales organization by social proximity to the displayed transaction influencers;

continuously searching the social network profile data of the employees of the prospective customers, by the at least one computer processor, to detect a plurality of trigger events, the trigger events comprising events that relate to updates about the transaction influencers, updates about product purchases at the prospective customers, or updates about an increase, or a decrease in social network usage at the prospective customers, and placing the detected plurality of trigger events into a sortable list that is prioritized based on business entities and the likelihood of the trigger events to lead to making sales to the business entities;

displaying the sortable list on one of the first user interface, the second user interface, the third user interface, or a fourth user interface;

automatically and dynamically detecting changes to ones of the plurality of trigger events;

automatically and dynamically updating the sortable list based on the dynamically detected changes to ones of the plurality of trigger events; and feeding the sortable list into a customer relations management system to assign respective employees of the sales organization as a representative to ones of the prospective customers based on at least one of the rank of the prospective customer; the social proximity of employees of the sales organization to the likely transaction influencers and the dynamically updated sortable list of trigger events.

10. The machine-readable storage device of claim 9 wherein searching the profile data comprises searching member profiles and searching member activities.

11. The machine-readable storage device of claim 9 wherein the customer relations management system presents the alerts on a user interface.

12. The machine-readable storage device of claim 9 wherein one or more of the plurality of trigger events comprise elements of a plurality of types of triggers.

* * * * *

UNITED STATES PATENT AND TRADEMARK OFFICE
CERTIFICATE OF CORRECTION

PATENT NO. : 9,628,430 B2
APPLICATION NO. : 13/756068
DATED : April 18, 2017
INVENTOR(S) : Shapero et al.

Page 1 of 1

It is certified that error appears in the above-identified patent and that said Letters Patent is hereby corrected as shown below:

In Column 28, Line 10, in Claim 9, delete "customer;" and insert --customer,-- therefor Signed and Sealed this
Tenth Day of July, 2018

Andrei Iancu
*Director of the United States Patent and Trademark Office*